(12) United States Patent
Lynch et al.

(10) Patent No.: US 10,493,486 B2
(45) Date of Patent: Dec. 3, 2019

(54) METHOD OF FORMING A PHOTOCHROMIC SEGMENTED MULTIFOCAL LENS

(71) Applicant: Transitions Optical, Inc., Pinellas Park, FL (US)

(72) Inventors: Paul J. Lynch, Galway (IE); Frank M. Haley, Glenshaw, PA (US); Anu Chopra, Pittsburgh, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 15/037,110

(22) PCT Filed: Nov. 17, 2014

(86) PCT No.: PCT/US2014/065918
§ 371 (c)(1),
(2) Date: May 17, 2016

(87) PCT Pub. No.: WO2015/077177
PCT Pub. Date: May 28, 2015

(65) Prior Publication Data
US 2016/0279886 A1 Sep. 29, 2016

Related U.S. Application Data

(60) Provisional application No. 61/906,520, filed on Nov. 20, 2013.

(51) Int. Cl.
*B29D 11/00* (2006.01)
*B05C 13/02* (2006.01)
(Continued)

(52) U.S. Cl.
CPC .............. *B05C 13/02* (2013.01); *B05D 1/005* (2013.01); *B05D 3/0493* (2013.01); *B05D 7/50* (2013.01);
(Continued)

(58) Field of Classification Search
CPC .......... G02B 3/10; G02B 1/041; B24B 13/00; B29D 11/00028
(Continued)

(56) References Cited

U.S. PATENT DOCUMENTS 4,190,621 A  2/1980  Greshes
4,279,401 A  7/1981  Ramirez et al.
(Continued)

FOREIGN PATENT DOCUMENTS

CN  1142797 A  2/1997
CN  101180177 A  5/2008
(Continued)

*Primary Examiner* — Elizabeth A Burkhart
(74) *Attorney, Agent, or Firm* — The Webb Law Firm

(57) ABSTRACT

A method of forming a photochromic segmented multifocal lens is described. The method involves, forming a segmented multifocal lens blank by molding, in which the segmented multifocal lens blank has a front surface and a rear surface. The front surface of the segmented multifocal lens blank includes a segmented optical power addition portion. The method further includes, grinding the rear surface of the segmented multifocal lens blank, thereby forming a segmented multifocal finished lens having a front surface and a rear surface. The front surface of the segmented multifocal finished lens includes the segmented optical power addition portion. The method additionally includes, forming a photochromic coating layer over at least a portion of the rear surface of the segmented multifocal finished lens. The photochromic coating layer includes at least one photochromic compound.

26 Claims, 1 Drawing Sheet

(51) Int. Cl.
  *G02C 7/06* (2006.01)
  *G02C 7/10* (2006.01)
  *B24B 13/00* (2006.01)
  *B05D 1/00* (2006.01)
  *B05D 3/04* (2006.01)
  *B05D 7/00* (2006.01)

(52) U.S. Cl.
  CPC .......... *B24B 13/0012* (2013.01); *B29D 11/00* (2013.01); *B29D 11/00028* (2013.01); *B29D 11/00653* (2013.01); *B29D 11/00865* (2013.01); *G02C 7/06* (2013.01); *G02C 7/102* (2013.01)

(58) Field of Classification Search
  USPC ......................................................... 427/164
  See application file for complete search history.

(56) References Cited

U.S. PATENT DOCUMENTS

| | | | |
|---|---|---|---|
| 4,556,605 A | 12/1985 | Mogami et al. | |
| 4,731,264 A | 3/1988 | Lin et al. | |
| 4,756,973 A | 7/1988 | Sakagami et al. | |
| 4,798,745 A | 1/1989 | Martz et al. | |
| 4,798,746 A | 1/1989 | Claar et al. | |
| 4,836,960 A | 6/1989 | Spector et al. | |
| 4,889,413 A | 12/1989 | Ormsby et al. | |
| 5,134,191 A | 7/1992 | Takarada et al. | |
| 5,231,156 A | 7/1993 | Lin | |
| 5,239,012 A | 8/1993 | McEntire et al. | |
| 5,458,814 A | 10/1995 | Kumar et al. | |
| 5,462,806 A | 10/1995 | Konishi et al. | |
| 5,618,586 A | 4/1997 | Swarup et al. | |
| 6,060,001 A | 5/2000 | Welch et al. | |
| 6,175,450 B1 | 1/2001 | Andreani et al. | |
| 6,187,444 B1 | 2/2001 | Bowles, III et al. | |
| 6,268,055 B1 | 7/2001 | Walters et al. | |
| 6,432,544 B1 | 8/2002 | Stewart et al. | |
| 6,506,488 B1 | 1/2003 | Stewart et al. | |
| 6,602,603 B2 | 8/2003 | Welch et al. | |
| 6,624,237 B2 | 9/2003 | Biteau et al. | |
| 7,157,518 B2 | 1/2007 | Biteau et al. | |
| 7,189,456 B2 | 3/2007 | King | |
| 7,261,843 B2 | 8/2007 | Knox et al. | |
| 7,410,691 B2 | 8/2008 | Blackburn et al. | |
| 7,452,611 B2 | 11/2008 | Blackburn et al. | |
| 7,465,414 B2 | 12/2008 | Knox et al. | |
| 7,465,415 B2 | 12/2008 | Wang et al. | |
| 7,527,754 B2 | 5/2009 | Chopra | |
| 7,556,751 B2 | 7/2009 | Chopra et al. | |
| 7,811,480 B2 | 10/2010 | King | |
| 8,147,725 B2 | 4/2012 | Chopra et al. | |
| 8,608,988 B2 | 12/2013 | Bowles et al. | |
| 8,748,634 B2 | 6/2014 | Chopra et al. | |
| 2004/0096666 A1 | 5/2004 | Knox et al. | |
| 2004/0145700 A1* | 7/2004 | Miniutti | G02C 7/02 351/159.56 |
| 2006/0022176 A1* | 2/2006 | Wang | C07D 311/78 252/583 |
| 2006/0227288 A1* | 10/2006 | Seibert | G02C 7/06 351/159.45 |
| 2006/0228557 A1 | 10/2006 | Kim et al. | |
| 2007/0122547 A1 | 5/2007 | Begon et al. | |
| 2009/0116126 A1* | 5/2009 | Berzon | B29D 11/00028 359/738 |
| 2011/0042629 A1* | 2/2011 | Chopra | C07D 311/78 252/586 |
| 2013/0142948 A1* | 6/2013 | Ohta | G02C 7/102 427/164 |

FOREIGN PATENT DOCUMENTS

| | | |
|---|---|---|
| EP | 0726138 A1 | 8/1996 |
| WO | 9420581 A1 | 9/1994 |
| WO | 9515845 A1 | 6/1995 |

* cited by examiner

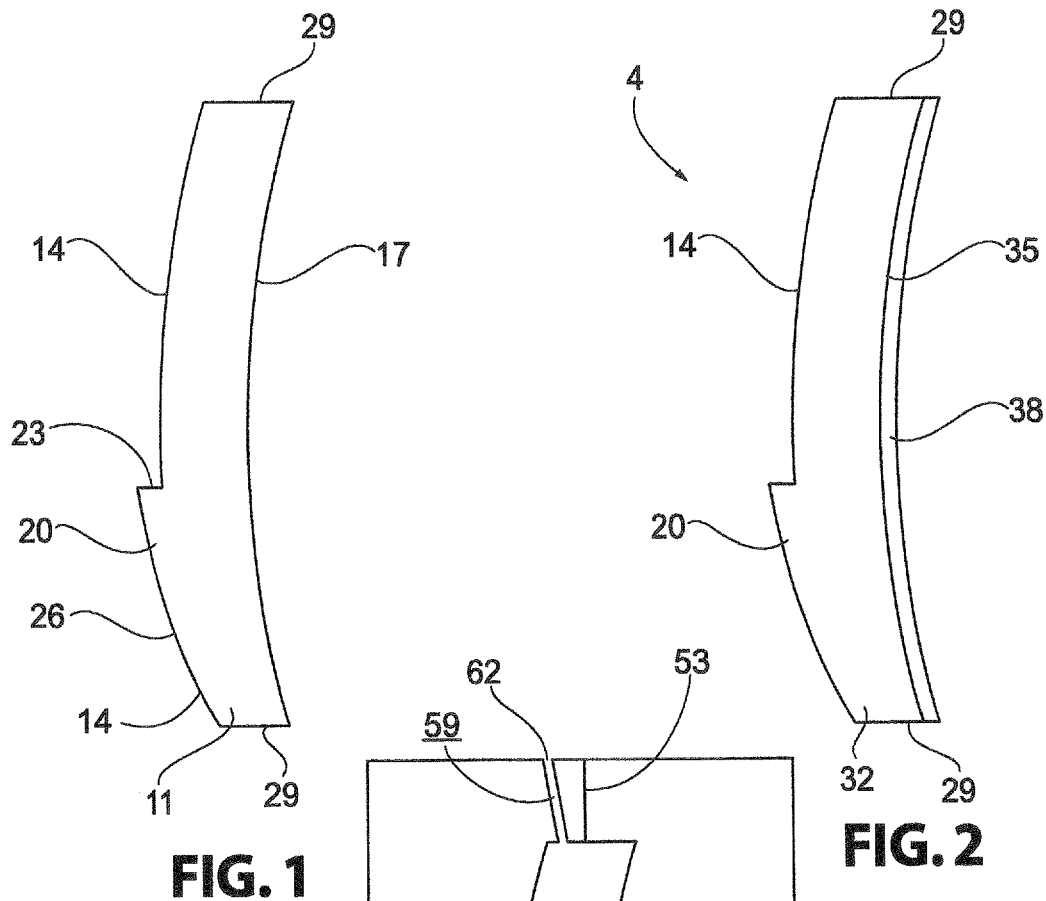
FIG. 1
FIG. 2
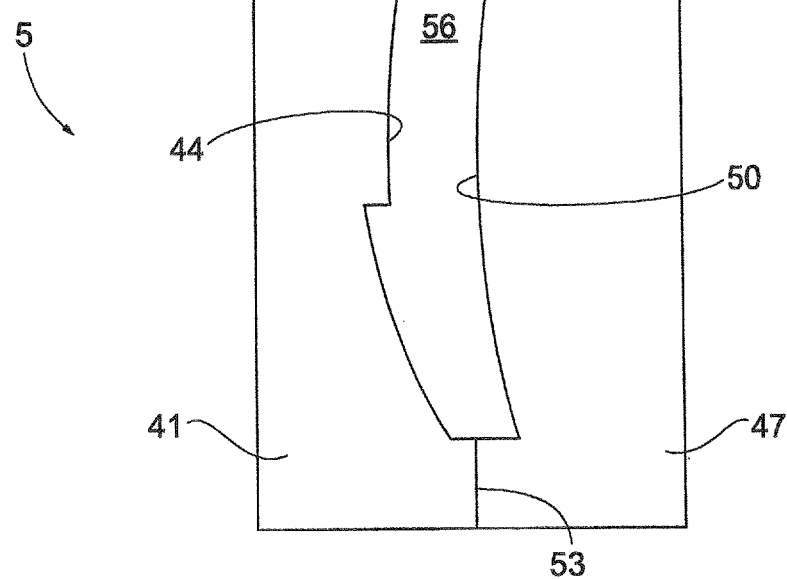
FIG. 3

METHOD OF FORMING A PHOTOCHROMIC SEGMENTED MULTIFOCAL LENS

CROSS REFERENCE TO RELATED APPLICATION

The present application is entitled to and claims priority to U.S. Provisional Patent Application No. 61/906,520, filed Nov. 20, 2013, the disclosure of which is incorporated herein by reference in its entirety.

FIELD

The present invention relates to a method of forming photochromic segmented multifocal lenses that involves forming by molding a segmented multifocal lens blank in which the front surface thereof includes a segmented optical power addition portion, grinding the rear surface of the lens blank, and forming a photochromic coating layer over at least a portion of the ground rear surface.

BACKGROUND

Optical lenses, such as ophthalmic lenses, are often fabricated by molding organic materials, such as plastics, for reasons including, for example, weight reduction relative to lenses fabricated from inorganic materials, such as silica glass. For individuals with presbyopia, ophthalmic lenses can be designed and fabricated to include more than one lens power within each lens, and are typically referred to as multifocal lenses. In some instances, the multifocal lens is a segmented multifocal lens in which the front surface thereof includes at least one segmented optical power addition portion that extends outward relative to the front surface of the lens.

Since optical lenses, such as ophthalmic lenses, are sometimes worn under conditions that involve exposure to actinic radiation, such as sunlight, it is desirable to provide the lenses with shading. Such shading can be provided by static dyes that do not change the level of shading and/or color with increased or decreased exposure to actinic radiation. The static dyes can be provided in the form of a coating over one or more surfaces of the optical lens. Optical lenses that are provided with shading by static dyes are generally not well suited for use under low light conditions, such as indoors, because they provide too much shading under such conditions. Photochromic compounds, in contrast to static dyes, are capable of reversibly changing the level of shading and/or color with increased or decreased exposure to actinic radiation.

In response to certain wavelengths of electromagnetic radiation (or "actinic radiation"), photochromic compounds, such as indeno-fused naphthopyrans, typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached, e.g., substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached) state. Compositions and articles, such as optical lenses, that contain photochromic compounds or have photochromic compounds applied thereto (e.g., in form of a photochromic coating composition) typically display colorless (e.g., clear) and colored states that correspond to the colorless and colored states of the photochromic compounds contained therein or applied thereto.

With some applications, photochromic compounds are provided in the form of a photochromic coating on the front surface of an optical lens, since the front surface typically faces and is directly exposed to the source of actinic radiation, such as sunlight. Typically, the rear surface of an optical lens blank is ground to introduce a desired optical correction or ophthalmic prescription into the lens. Providing a photochromic coating on the front surface of the lens blank allows for grinding of the rear surface without damaging the photochromic coating.

With segmented multifocal lens in which the front surface thereof includes at least one segmented optical power addition portion that extends outward relative to the front surface of the lens, applying a photochromic coating to the front surface results, in some instances, in the formation of defects due to a lack of uniform coating thickness associated with the optical power addition portion. Such a lack of uniform coating thickness can result in the undesirable formation of line defects including, for example, darker lines and/or lighter lines, when the coated optical lens is exposed to actinic radiation. Ophthalmic articles with such coating defects typically do not meet minimal required cosmetic standards.

It would be desirable to develop new methods of forming photochromic segmented multifocal lenses. It would also be desirable that such newly developed methods minimize or eliminate defects associated with non-uniform coating thicknesses on and around the multifocal segment where such defects can lead to unacceptable optical distortions.

SUMMARY

In accordance with the present invention, there is provided a method of forming a photochromic segmented multifocal lens comprising: (a) forming a segmented multifocal lens blank by molding, wherein the segmented multifocal lens blank has a front surface and a rear surface, the front surface of the segmented multifocal lens blank comprising a segmented optical power addition portion; (b) grinding the rear surface of the segmented multifocal lens blank, thereby forming a segmented multifocal finished lens having a front surface and a rear surface, in which the front surface of the segmented multifocal finished lens comprises the segmented optical power addition portion; and (c) forming a photochromic coating layer over at least a portion of the rear surface of the segmented multifocal finished lens, in which the photochromic coating layer comprises at least one photochromic compound.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

FIG. 1 is a representative sectional view of a segmented multifocal lens blank that can be used with some embodiments of the method of the present invention;

FIG. 2 is a representative sectional view of a segmented multifocal finished lens that includes a photochromic coating on the rear surface thereof prepared in accordance with some embodiments of the present invention; and FIG. 3 is a representative sectional view of a mold in which a segmented multifocal lens blank can be made in accordance with some embodiments of the present invention.

In FIGS. 1-3 like characters refer to the same structural features and/or components, as the case may be, unless otherwise stated.

DETAILED DESCRIPTION

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

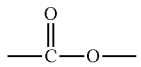

or equivalently —C(O)O—, is inclusive of the right-to-left representation thereof,

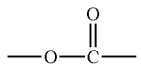

or equivalently —O(O)C— or —OC(O)—.

Other than in the operating examples, or where otherwise indicated, all numbers expressing dimensions, quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{20}$ alkyl groups; and groups that are appropriately branched, such as branched $C_3$-$C_{20}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycyclocalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as —N($R_{11}$')($R_{12}$') where $R_{11}$' and $R_{12}$' are each independently selected, with some embodiments, from hydrogen, linear or branched $C_1$-$C_{20}$ alkyl, $C_3$-$C_{12}$ cycloakyl, $C_3$-$C_{12}$ heterocycloalkyl, aryl, and heteroaryl.

As used herein, recitations of "halo substituted" and related terms (such as, but not limited to, haloalkyl groups, haloalkenyl groups, haloalkynyl groups, haloaryl groups and halo-heteroaryl groups) means a group in which at least one, and up to and including all of the available hydrogen groups thereof is substituted with a halo group. The term "halo-substituted" is inclusive of "perhalo-substituted." As used herein, the term perhalo-substituted group and related terms (such as, but not limited to perhaloalkyl groups, perhaloalkenyl groups, perhaloalkynyl groups, perhaloaryl groups and perhalo-heteroaryl groups) means a group in which all of the available hydrogen groups thereof are substituted with a halo group. For example, perhalomethyl is —$CX_3$; perhalophenyl is —$C_6X_5$, where X represents one or more halo groups, such as, but not limited to F.

The photochromic compounds of the method of the present invention include groups and sub-groups that can in each case be independently selected from hydrocarbyl and/or substituted hydrocarbyl. As used herein the term "hydrocarbyl" and similar terms, such as "hydrocarbyl substituent," means: linear or branched $C_1$-$C_{25}$ alkyl (e.g., linear or branched $C_1$-$C_{10}$ alkyl); linear or branched $C_2$-$C_{25}$ alkenyl (e.g., linear or branched $C_2$-$C_{10}$ alkenyl); linear or branched $C_2$-$C_{25}$ alkynyl (e.g., linear or branched $C_2$-$C_{10}$ alkynyl); $C_3$-$C_{12}$ cycloalkyl (e.g., $C_3$-$C_{10}$ cycloalkyl, and including polycyclic cycloalkyl); $C_3$-$C_{12}$ heterocycloalkyl (having at least one hetero atom in the cyclic ring, and including polycyclic heterocycloalkyl); $C_5$-$C_{18}$ aryl (including polycyclic aryl groups) (e.g., $C_5$-$C_{10}$ aryl); $C_5$-$C_{18}$ heteroaryl (having at least one hetero atom in the aromatic ring, and including polycyclic heterooaryl groups); and $C_6$-$C_{24}$ aralkyl (e.g., $C_6$-$C_{10}$ aralkyl).

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, 1-propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative heterocycloalkyl groups include but are not limited to imidazolyl, tetrahydrofuranyl, tetrahydropyranyl and piperidinyl. Representative aryl groups include but are not limited to phenyl, naphthyl, anthracynyl and triptycenyl. Representative heteroaryl groups include but are not limited to furanyl, pyranyl, pyridinyl, isoquinoline, and pyrimidinyl. Representative aralkyl groups include but are not limited to benzyl, and phenethyl.

The term "substituted hydrocarbyl" as used herein means a hydrocarbyl group in which at least one hydrogen thereof has been substituted with a group that is other than hydrogen, such as, but not limited to, halo groups, hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (e.g., alkyl, alkenyl, alkynyl, cycloalkyl, heterocycloalkyl, aryl, heteroaryl, and aralkyl groups), and amine groups, such as —N($R_{11}$')($R_{12}$') where $R_{11}$' and $R_{12}$' are each independently selected from hydrogen, hydrocarbyl and substituted hydrocarbyl.

The term "substituted hydrocarbyl" is inclusive of halohydrocarbyl (or halo substituted hydrocarbyl) substituents. The term "halohydrocarbyl" as used herein, and similar terms, such as halo substituted hydrocarbyl, means that at least one hydrogen atom of the hydrocarbyl (e.g., of the alkyl, alkenyl, alkynyl, cycloalkyl, heterocycloalkyl, aryl, heteroaryl, and aralkyl groups) is replaced with a halogen atom selected from chlorine, bromine, fluorine and iodine. The degree of halogenation can range from at least one hydrogen atom but less than all hydrogen atoms being replaced by a halogen atom (e.g., a fluoromethyl group), to full halogenation (perhalogenation) in which all replaceable hydrogen atoms on the hydrocarbyl group have each been replaced by a halogen atom (e.g., trifluoromethyl or perfluoromethyl). Correspondingly, the term "perhalohydrocarbyl group" as used herein means a hydrocarbyl group in which all replaceable hydrogens have been replaced with a halogen. Examples of perhalohydrocarbyl groups include, but are not limited to, perhalogenated phenyl groups and perhalogenated alkyl groups.

The hydrocarbyl and substituted hydrocarbyl groups from which the various groups described herein can each be independently selected, in some instances and with some embodiments, can in each case be independently and optionally interrupted with at least one of —O—, —S—, —C(O)—, —C(O)O—, —S(O)—, —$SO_2$—, —N=N—, —N($R_{11}$')— where $R_{11}$' is selected from hydrogen, hydrocarbyl or substituted hydrocarbyl, —Si(O$R_8$')$_w$($R_8$')$_t$—, where w and t are each independently selected from 0 to 2, provided that the sum of w and t is 2, and each $R_8$' is independently selected from hydrogen, hydrocarbyl and substituted hydrocarbyl, and combinations of two or more thereof. As used herein, by interrupted with at least one of —O—, —S—, —C(O)—, —C(O)O—, —OC(O)O—, —S(O)—, —$SO_2$—, —N=N—, —N($R_{11}$')—, and —Si(O$R_8$')$_w$($R_8$')$_t$—, means that at least one carbon of, but less than all of the carbons of, the hydrocarbyl group or substituted hydrocarbyl group, is in each case independently replaced with one of the recited divalent non-carbon linking groups. The hydrocarbyl and substituted hydrocarbyl groups can be interrupted with two or more of the above recited linking groups, which can be adjacent to each other or separated by one or more carbons.

For purposes of non-limiting illustration, a combination of adjacent —C(O)— and —N($R_{11}$')— can provide a divalent amide linking or interrupting group, —C(O)—N($R_{11}$')—. For purposes of further non-limiting illustration, a combination of adjacent —N($R_{11}$')—, —C(O)— and —O— can provide a divalent carbamate (or urethane) linking or interrupting group, —N($R_{11}$')—C(O)—O—, where $R_{11}$' is hydrogen.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited previously herein. Alkyl groups of the various compounds of the present invention can, with some embodiments, include one or more unsaturated linkages selected from —CH=CH— groups and/or one or more —C≡C— groups, provided the alkyl group is free of two or more conjugated unsaturated linkages. With some embodiments, the alkyl groups are free of unsaturated linkages, such as —CH=CH— groups and —C≡C— groups.

The term "cycloalkyl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, those recited previously herein. The term "cycloalkyl" as used herein in accordance with some embodiments also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein, in accordance with some embodiments, means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, those recited previously herein. The term "heterocycloalkyl" as used herein, in accordance with some embodiments, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

The term "heteroaryl," as used herein, in accordance with some embodiments, includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, those recited previously herein.

As used herein, the term "fused ring polycyclic-aryl-alkyl group" and similar terms such as, fused ring polycyclic-alkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-flourenyl, cyclopentanaphthenyl, and indacenyl.

The term "aralkyl," as used herein, and in accordance with some embodiments, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein.

The method of the present invention involves with some embodiments, forming a segmented multifocal lens blank having a front surface and a rear surface, in which the front surface of the segmented multifocal lens blank includes a segmented optical power addition portion. For purposes of non-limiting illustration and with reference to FIG. 1 of the drawings, there is depicted a segmented multifocal lens blank 11 that includes a front surface 14 and a rear surface 17. Front surface 14 of segmented multifocal lens blank 11 includes a segmented optical power addition. Segmented optical power addition portion 20 extends outward relative to front surface 14. As depicted in FIG. 1, segmented optical power addition portion 20 represents or defines a bifocal portion of segmented multifocal lens blank 11. With some embodiments, the segmented optical power addition portion of the segmented lens blank can include a plurality of segments, not depicted, and can define, for example, a trifocal portion of the segmented multifocal lens blank.

The segmented multifocal lens blank can have any suitable size and geometric shape. With some embodiments, the segmented multifocal lens blank is substantially circular, having a diameter of from 65 mm to 85 mm, and a thickness of from 5 mm to 20 mm.

With some embodiments, the segmented optical power addition portion includes an upper portion and a lower portion. With reference to FIG. 1, segmented optical power addition portion 20 has an upper portion 23 and a lower portion 26, which can each independently have any suitable shape. Upper portion 23 is, with some embodiments and as depicted, in the form of a ledge that extends laterally outward from front surface 14. With some further embodiments, upper portion 23 has an arcuate shape, not depicted, that extends gradually and arcuately outward from front surface 14. Lower portion 26, with some embodiments can extend outward from or relative to front surface 14, and have any suitable shape, such as a ledge (not depicted) or arcuate shape. With some embodiments, lower portion 26 is substantially continuous with the outer edge 29 of the segmented multifocal lens blank (not depicted).

The segmented multifocal lens blank is, with some embodiments, a substantially unitary article, such as depicted with the segmented multifocal lens blank 11 of FIG. 1. In accordance with some further embodiments, the segmented multifocal lens blank is composed of two or more portions or layers (not depicted in the drawings). With some embodiments, the segmented multifocal lens blank includes at least two layers, in which each layer is independently selected (or formed) from, a lens molding composition (or lens composition), a mold insert layer, and an in-mold coating composition, provided that at least one layer is (or is formed from) a lens molding composition. The lens molding composition is, with some embodiments, chosen from a thermoplastic lens molding composition, a crosslinkable (or curable) lens molding composition, and combinations thereof, as discussed in further detail herein.

In further accordance with some embodiments of the present invention, the rear surface of the segmented multifocal lens blank is subjected to grinding, which results in formation of a segmented multifocal finished lens having a front surface and a rear surface. The front surface of the segmented multifocal finished lens includes the segmented optical power addition portion. Grinding of the rear surface of the segmented multifocal lens blank is conducted, with some embodiments, for purposes of: (i) imparting an optical correction or ophthalmic prescription into the segmented multifocal lens blank (and correspondingly the resulting segmented multifocal finished lens); and/or (ii) thinning/reducing the thickness of the segmented multifocal lens blank (and correspondingly the resulting segmented multifocal finished lens). Grinding of the rear surface is, with some embodiments, conducted in accordance with art-recognized methods. Grinding, with some embodiments, includes rotating and/or reciprocating a grinding pad over at least a portion of the rear surface with a liquid grinding composition there-between, which optionally includes a grinding media.

The method of the present invention, with some embodiments, further includes forming a photochromic coating layer over at least a portion of the rear surface of the segmented multifocal finished lens. The photochromic coating layer includes at least one photochromic compound, as will be described in further detail herein.

For purposes of nonlimiting illustration, and with reference to FIG. 1 and FIG. 2 of the drawings, rear surface 17 of segmented multifocal lens blank 11 is subjected to grinding, which results in the formation of segmented multifocal finished lens 32. Segmented multifocal finished lens 32 has a front surface 14 and a rear surface 35. Front surface 14 of segmented multifocal finished lens 32 includes the segmented optical power addition portion 20. In accordance with some embodiments of the present invention, a photochromic coating layer 38 is formed over at least a portion of rear surface 35 of segmented multifocal finished lens 32. With some embodiments, photochromic coating layer 38 is formed over substantially all of rear surface 35.

Formation of the photochromic coating layer over at least a portion of the rear surface of the segmented multifocal finished lens results, with some embodiments, in the formation of the photochromic segmented multifocal lens. In accordance with some further embodiments, the method of the present invention further includes edging the photochromic segmented multifocal finished lens, which results in formation of a photochromic segmented multifocal edged lens that is dimensioned to be received and retained within an optical frame, such as, but not limited to, an ophthalmic frame. Edging, with some embodiments, is conducted in accordance with art-recognized methods.

With reference to FIG. 2 and for purposes of non-limiting illustration, the formation of photochromic coating layer 38 on at least a portion of rear surface 35 of segmented multifocal finished lens 32 results, with some embodiments, in the formation of photochromic segmented multifocal finished lens 4. Photochromic segmented multifocal finished lens 4 includes segmented multifocal finished lens 32 (or segmented multifocal finished lens body 32), which includes a front surface 14, a rear surface 35 and outer edge 29 (which is, with some embodiments, a substantially continuous outer edge 29). Front surface 14 includes a segmented optical power addition portion 20, as described previously herein. Photochromic segmented multifocal finished lens 4 further includes photochromic coating layer 38, which resides over at least a portion of rear surface 35.

Photochromic segmented multifocal finished lens 4 is, in accordance with some embodiments, subjected to edging, which results in formation of a photochromic segmented multifocal edged lens (not shown in the drawings).

Edging, with some embodiments, is conducted in accordance with art-recognized methods that involve trimming or cutting outer edge 29 so that the resulting photochromic segmented multifocal edged lens is dimensioned and has a shape for receipt and retention within an optical frame (or ophthalmic lens frame). The photochromic segmented multifocal edged lens can, with some embodiments, have a shape (relative to a top plan view thereof—not shown) chosen from, for example, circular shapes, elliptical shapes, and polygonal shapes, such as triangular shapes, rectangular shapes, hexagonal shapes, and octagonal shapes, and combinations thereof.

The photochromic coating layer can have any suitable thickness, provided it provides a desirable level of photochromic properties, such as but not limited to a desirable range of optical density values. With some embodiments, the photochromic coating layer has a thickness of from 0.5 to 50 microns, such as from 1 to 45 microns, or from 2 to 40 microns, or from 5 to 30 microns, or from 10 to 25 microns.

Forming the segmented multifocal lens blank by molding includes, with some embodiments of the present invention; (i) providing a mold having an interior space; (ii) introducing a lens molding composition into the interior space of the mold; and (iii) removing the segmented multifocal lens blank from the mold. The lens molding composition is, with some embodiments, chosen from a thermoplastic lens molding composition, a crosslinkable (or curable) lens molding composition, and combinations thereof.

For purposes of non-limiting illustration and with reference to FIG. 3 of the drawings, mold 5 includes a first mold portion 41 having an interior surface 44, and a second mold portion 47 having an interior surface 50. When first mold portion 41 and second mold portion 47 are brought into abutting relationship with each other, such as along abutment line 53, interior surface 44 and interior surface 50 together define interior space 56 of mold 5. Mold 5 can, with some embodiments, include additional mold portions (not shown). The mold portions, such as first and second mold portions 41 and 47 can be fabricated from any suitable material, such as, with some embodiments, metal, ceramic, silica glass, borosilicate glass, quartz glass, and combinations thereof. Mold 5 can, with some embodiments, include one or more gaskets (not shown) that serve to seal interior space 56.

The lens molding composition is introduced into the interior space of the mold, with some embodiments, through one or more channels. With further reference to FIG. 3, first mold portion 41 of mold 5 includes a channel 59 that provides fluid communication between an inlet 62 of channel 59 and interior space 56 of mold 5. The lens molding composition, with some embodiments, is introduced from a reservoir (not shown) into interior space 56 through inlet 62 and channel 59. Interior space 56 is substantially filled with the lens molding composition. The lens molding composition within interior space 56 is: (i) subjected to crosslinking conditions; and/or (ii) allowed to cool to a temperature that allows for removal of the resulting segmented multifocal lens blank from mold 5, and in particular from interior space 56 thereof.

Removing the segmented multifocal lens blank from the mold involves, with some embodiments, separating the mold portions from each other. With some embodiments, after formation of the segmented multifocal lens blank within interior space 56 of mold 5, the first 41 and second 47 mold portions are separated from each other, and the segmented multifocal lens blank (e.g., 11) is in effect removed from interior space 56.

The segmented multifocal lens blank includes an organic matrix. The organic matrix of the segmented multifocal lens blank includes, with some embodiments, one or more art-recognized oligomeric and/or polymeric organic materials from which optical lenses, such as ophthalmic lenses, are fabricated. In accordance with some embodiments, the segmented multifocal lens blank includes an organic matrix that includes, polycarbonate, poly(allyl-carbonate), polyurethane, polythiourethane, poly(urea-urethane), poly(meth)acrylate, polyolefin, polyvinyl, polyester, polyether, poly(siloxane), and combinations thereof. Additional and/or more specific examples of polymers that can be included in the organic matrix of the segmented multifocal lens blank include, but are not limited to: LEXAN thermoplastic polycarbonate; MYLAR polyester; PLEXIGLASS poly(methyl methacrylate); and TRIVEX poly(urea-urethane).

The lens molding composition is, with some embodiments, chosen from a thermoplastic lens molding composition, a crosslinkable lens molding composition, and combinations thereof. Crosslinkable molding compositions are crosslinked to form a 3-dimensional crosslink network of covalent bonds. Crosslinking of the crosslinkable molding composition can be achieved by methods including, but not limited to, exposure to elevated temperature, exposure to actinic light, allowing mixed reactive components to react with each other, and combinations thereof.

The lens molding composition, with some embodiments, includes one or more radically polymerizable monomers. Examples of radically polymerizable monomers that can be included in the lens molding composition include, but are not limited to: $C_1$-$C_{20}$ linear, branched, or cyclic alkyl (meth)acrylate monomers; allylic monomers; bis(allyl carbonate) monomers, such as polyol(allyl carbonate) monomers, such as polyalkylene glycol bis(allyl carbonate) monomers, dithylene glycol bis(allyl carbonate) monomer, bisphenol A bis(allyl carbonate) monomer, and alkoxylated bisphenol A bis(allyl carbonate) monomers; polyfunctional (meth)acrylate monomers, such as alkylene glycol bis(meth)acrylate monomers, polyalkylene glycol bis(meth)acrylate monomers, trimethylolpropane tris(meth)acrylate monomer, alkoxylated trimethylolpropane tris(meth)acrylate monomers, polyalkoxylated trimethylolpropane tris(meth)acrylate monomers, pentaerythritol tris(meth)acrylate, pentaerythritol tetrakis(meth)acrylate, alkoxylated pentaerythritol tris(meth)acrylate, alkoxylated pentaerythritol tetrakis(meth)acrylate, polyalkoxylated pentaerythritol tris(meth)acrylate, polyalkoxylated pentaerythritol tetrakis(meth)acrylate, dipentaerythritol hexakis(meth)acrylate, alkoxylated, dipentaerythritol hexakis(meth)acrylate, and polyalkoxylated dipentaerythritol hexakis(meth)acrylate; vinyl aromatic monomers, such as styrene, alpha-methylstyrene, p-chloromethylstyrene, divinyl benzene, vinyl naphthalene and divinyl naphthalene; vinyl esters of carboxylic acids such as, vinyl acetate, vinyl butyrate, vinyl 3,4-dimethoxybenzoate, and vinyl benzoate; olefin monomers, such as propylene, 1-butene, 1,3-butadiene, isobutylene and diisobutylene; and other ethylenically unsaturated radically polymerizable monomers, such as cyclic anhydrides (such as maleic anhydride, 1-cyclopentene-1,2-dicarboxylic anhydride and itaconic anhydride), esters of acids that are unsaturated but do not have alpha, beta-ethylenic unsaturation, (such as methyl ester of undecylenic acid), and diesters of ethylenically unsaturated dibasic acids (such as diethyl maleate).

As used herein, by "allylic monomer(s)" is meant monomers containing substituted and/or unsubstituted allylic functionality, such as one or more radicals represented by the following Formula (A),

$$H_2C=C(R^d)-CH_2- \tag{A}$$

With reference to Formula (A), $R^d$ is hydrogen, halogen or a $C_1$ to $C_4$ alkyl group. With some embodiments, $R^d$ is hydrogen or methyl and consequently Formula (A) represents an unsubstituted (meth)allyl radical. Examples of allylic monomers include, but are not limited to: (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Examples of $C_1$-$C_{20}$ linear, branched, or cyclic alkyl (meth)acrylate monomers that can be present in the lens molding composition include, but are not limited to, methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate.

The lens molding composition can further include, with some embodiments, an initiator that is capable of initiating free radical polymerization of and amongst the ethylenically unsaturated groups of the monomers thereof. With some embodiments, the lens molding composition includes a free radical initiator that is thermally activated. By "thermally activated" means the free radical initiator become active at elevated temperature, such as at temperatures greater than ambient room temperature, such as greater than 25° C., as will be described in further detail herein.

The thermally activated free radical initiator can, with some embodiments, be selected from organic peroxy compounds, azobis(organonitrile) compounds, N-acyloxyamine compounds, O-imino-isourea compounds, and combinations of two or more thereof.

Examples of organic peroxy compounds, that can be used as thermal polymerization initiators include, but are not limited to: peroxymonocarbonate esters, such as tertiarybutylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauryl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. With some embodiments, further examples of peroxy compounds from which the free radical initiator can be selected include, but are not limited to, 2,5-dimethyl-2,5-di(2-ethylhexylperoxy)hexane, and/or 1,1-bis(tert-butylperoxy)-3,3,5-trimethylcyclohexane.

Examples of azobis(organonitrile) compounds, that can be used as thermal polymerization initiators in the lens molding composition, include, but are not limited to, azobis (isobutyronitrile), 2,2'-azobis(2-methyl-butanenitrile), and/or azobis(2,4-dimethylvaleronitrile).

With some further embodiments, the thermally activated free radical initiator is selected from 1-acetoxy-2,2,6,6-tetramethylpiperidine, and/or 1,3-dicyclohexyl-O—(N-cyclohexylideneamino)-isourea.

The lens molding composition, with some embodiments, includes a first reactant that has active hydrogen groups, and a second reactant that has groups that are reactive with (and form covalent bonds) with the active hydrogen groups of the first reactant, such as but not limited to, oxirane groups, thiooxirane groups, isocyanate groups, thioisocyanate groups, cyclic carbonate groups, and cyclic ester groups. With some embodiments, the lens molding composition includes: a first reactant having active hydrogen groups selected from hydroxyl, thiol, primary amine, and secondary amine; and a second reactant having isocyanate groups.

Examples of isocyanate functional reactants that can be included in the lens molding composition include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1, 6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2, 4-diisocyanate; hexahydrotoluene-2,6-diisocyanate; hexahydrophenylene-1,3-diisocyanate; hexahydrophenylene-1, 4-diisocyanate; perhydrodiphenylmethane-2,4'-diisocyanate; perhydrodiphenylmethane-4,4'-diisocyanate and mixtures thereof.

Examples of polyols that can be included in the lens molding composition include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, heptanediol, hexanediol, octanediol, 2,2-bis(4-cyclohexanol)propane, neopentyl glycol, 2,2,3-trimethylpentane-1,3-diol, 1,4-dimethylolcyclohexane, 2,2,4-trimethylpentane diol, and like polyols.

Examples of polythiols that can be included in the lens molding composition include, but are not limited to, art-recognized polythiols. With some embodiments, a hydroxy functional material, such as one or more polyols as described previously herein, is reacted with epithiochlorohydrin, which results in the formation of an intermediate material having at least two thiirane groups. The thiirane groups of the intermediate material can, with some embodiments, be subsequently ring-opened in accordance with art-recognized methods so as to form a material having at least two thiol groups, which can be included in the lens molding composition.

Classes of polyamines that can be included in the lens molding composition, with some embodiments, include but are not limited to linear or branched aliphatic amines, cycloaliphatic amines, heterocycloaliphatic amines, aromatic amines, heteroaromatic amines, and combinations of two or more thereof. In accordance with some further embodiments, examples of polyamines that can be included in the lens molding composition include, but are not limited to, diaminocyclohexane, 4,4'-methylenedi(cyclohexylamine), 4,4'-(propane-2,2-diyl)dicyclohexanamine, 3,3'-dimethyl-methylenedi(cyclohexylamine), 4,4'-(propane-2,2-diyl)dianiline, 4,4'-methylenedianiline, piperazine, N-amino ethyl piperazine, 5-amino-1-aminomethyl-1,3,3-trimethyl-cyclohexane, diamino ethane, diamino propane, diaminobutane, diaminopentane, diaminohexane, diaminoheptane, diaminooctane, diaminodecane, diaminoundecane, diaminododecane, dicyanamide, 4,4'-diaminodiphenyl sulfone, melamine, and combinations of two or more thereof.

With some embodiments, the lens molding composition is subjected to elevated temperature so as to cause and/or expedite crosslinking and cure thereof (in the case of a crosslinkable lens molding composition). With some embodiments, after introduction into the interior space of the mold, the lens molding composition is heated, optionally in the presence of an initiator, from room temperature, such as 25° C., up to 50° C. to 150° C., over a period of from 2 hours to 48 hours, or from 55° C. up to 90° C. or 100° C. over a period of from 12 to 24 hours, or from 65° C. up to 115° C. or 125° C. over a period of from 12 to 24 hours.

The segmented multifocal lens blank, with some embodiments, is prepared in accordance with art-recognized molding methods using art-recognized lens molding compositions, such as described in U.S. Pat. Nos. 4,279,401, 4,190,621, and 4,836,960.

The photochromic coating layer includes at least one photochromic compound. With some embodiments, the photochromic coating layer, includes indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

The photochromic compound is present in the photochromic coating layer in an amount at least sufficient so as to provide the photochromic segmented multifocal lens with a desirable level of photochromic properties, which in some embodiments is referred to as a photochromic amount. With some embodiments, the amount of photochromic compound(s) present in the photochromic coating layer is from 0.01 percent by weight to 40 percent by weight, based on the total weight of photochromic coating layer.

The photochromic coating layer is formed on or over the rear surface of the photochromic segmented multifocal lens, with the method of the present invention. The source of actinic radiation that activates the photochromic compounds of the photochromic coating layer is typically located forward of the front surface of the photochromic segmented multifocal lens. A portion of the electromagnetic radiation of the actinic radiation source is typically absorbed over a range of wavelengths by and as it passes through the organic matrix of the photochromic segmented multifocal lens and any optional further coating layers that are present and positioned forward of the photochromic layer. As such, with some embodiments, each photochromic compound of the photochromic coating layer is selected such that it is activated by wavelengths of electromagnetic radiation that are greater than those that are absorbed by the organic matrix of the photochromic segmented multifocal lens and any optional further coating layers that are present and positioned forward of the photochromic layer. By "activated" is meant the photochromic compound is converted from a closed-form (bleached, e.g., substantially colorless state) to an open-form (colored state).

In accordance with some embodiments, the photochromic compound, of the photochromic coating layer, is converted from a closed-form to an open-form by electromagnetic radiation having a wavelength of greater than 320 nm, or greater than 340 nm.

The photochromic compound, of the photochromic coating layer, is converted from a closed-form to an open-form by electromagnetic radiation having a wavelength of greater than 390 nm, with some further embodiments.

In accordance with some additional embodiments, the photochromic compound, of the photochromic coating layer, is converted from a closed-form to an open-form by electromagnetic radiation having a wavelength of greater than 390 nm to 450 nm.

The photochromic compound, of the photochromic coating layer, includes at least one indeno-fused naphthopyran, in accordance with some embodiments of the present invention.

In accordance with some embodiments of the present invention, the indeno-fused naphthopyran of the photochromic coating layer is represented by the following Formula (I),

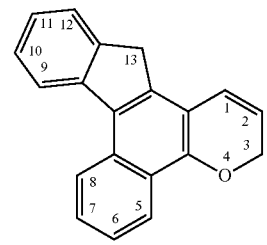 [SMILES: C1=Cc2c3c(c4ccccc4c2OC1)-c1ccccc1C3]

With reference to Formula (I), a pi-conjugation extending group is bonded to at least one of, 6-position, the 7-position, and/or the 11-position of the indeno-fused naphthopyran, with some embodiments. With further reference to Formula (I), and in accordance with some further embodiments, a pi-conjugation extending group is bonded to the 11-position of the indeno-fused naphthopyran, and the 6-position and the 7-position are each free of a pi-conjugation extending group bonded thereto. The pi-conjugation extending group in each case independently extends the pi-conjugation system of the indeno-fused naphthopyran. With further reference to Formula (I), the 13-position of said indeno-fused naphthopyran is free of spiro-substituents, with some embodiments.

As used herein, the terms "10-position," "11-position," "12-position," "13-position," etc. refer to the 10-, 11-, 12- and 13-position, etc. of the ring atoms of the indeno-fused naphthopyran, respectively. With some embodiments the indeno-fused naphthopyran is an indeno[2',3':3,4]naphtho[1,2-b]pyran, and the ring atoms of the indeno-fused naphthopyran are numbered as shown in Formula (I) above.

As used herein, the term "pi-conjugation extending group" and similar terms, such as "pi-conjugation extending group bonded to the 6-position, 7-positions, and/or 11-position of the indeno-fused naphthopyran" means a group having at least one pi-bond (π-bond) (e.g., a double bond and/or a triple bond) in conjugation with the pi-conjugated system of the indeno-fused naphthopyran. In such a system, the pi-electrons in the pi-conjugated system of the indeno-fused naphthopyran can be de-localized over the combined pi-system of the indeno-fused naphthopyran and the pi-conjugation extending group bonded to the 6-position, 7-position, and/or the 11-position thereof (i.e., the group having at least one pi-bond in conjugation with the pi-conjugated system of the indeno-fused naphthopyran). Conjugated bond systems can, with some embodiments, be represented by an arrangement of at least two double or triple bonds separated by one single bond, that is a system containing alternating double (and/or triple) bonds and single bonds, wherein the system contains at least two double (and/or triple) bonds. Non-limiting examples of groups that can extend the pi-conjugated system of the indeno-fused naphthopyran, with some embodiments, are set forth below in further detail.

The pi-conjugation extending group that is bonded to the 6-position, 7-position, and/or the 11-position of the indeno-fused naphthopyran represented by Formula (I), with some embodiments, in each case independently includes at least one pendent halo-substituted group bonded thereto.

As used herein, the term "pendent halo-substituted group" and similar terms, such as pendent halo-substituted alkyl group, means a group in which at least 50 percent by number (e.g., at least 60, 65, 80 or 90 percent by number) of available substitutable atoms (e.g., hydrogen atoms) that may be substituted (i.e., replaced) with a halogen atom (e.g., fluorine) are so substituted with a halogen atom, based on the total number of such available substitutable atoms. For purposes of non-limiting illustration, in the case a pendent halo-substituted methyl group, at least two of the three available substitutable hydrogen atoms thereof are substituted with a halogen atom, in which case the pendent halo-substituted methyl group may be selected from dihalomethyl (e.g., —CHX$_2$), trihalomethyl (—CX$_3$) and combinations thereof, wherein each X independently is the same or a different halogen atom in each instance. With some embodiments of the present invention, the pendent halo-substituted group is selected from halo-substituted groups in which 100 percent by number of available substitutable atoms are substituted by a halogen atom, based on total number of available substitutable atoms. Pendent halo-substituted groups in which 100 percent by number of available substitutable atoms are substituted by a halogen atom, based on total number of available substitutable atoms, are inclusive of and may be referred to herein and in the claims as "pendent perhalo groups" (e.g., pendent perhalo alkyl groups).

The term "pendent halo-substituted group" as used herein, is not inclusive of one or more single halogens or halo groups (e.g., —F) bonded directly to the pi-conjugation extending group of the 6-position, the 7-position, and/or the 11-position of the indeno-fused naphthopyran. While, with some embodiments, the pi-conjugation extending group, of the 6-position, 7-position, and/or the 11-position of the indeno-fused naphthopyran of the photochromic material of the present invention, can in each case independently have one or more single halogens (or halo groups) bonded directly thereto, the term "pendent halo-substituted group," is not inclusive of such one or more single halogens.

More particularly, as used herein, the term "pendent halo-substituted group" and similar terms, such as pendent halo-substituted alkyl group, means a group in which: (i) at least 50 percent by number of available substitutable atoms are substituted by a halogen atom, based on total number of available substitutable atoms, as described above; and (ii) at least one (and more typically each) available substitutable atom (e.g., hydrogen atom) of the alpha carbon (and more typically of each of the alpha and beta carbons) of the halo-substituted group is substituted with a halogen atom. For purposes of non-limiting illustration, when the pendent halo-substituted group is halo-substituted ethyl, the halo-substituted ethyl group can be selected from: —CXH—CX$_2$H; —CX$_2$CH$_2$X; —CXH—CX$_3$; —CX$_2$—CX$_2$H; and —CX$_2$CX$_3$, in which each X independently is the same or a different halogen atom in each instance. With some embodiments, the halo-substituted ethyl group is selected from: —CX$_2$CH$_2$X; —CX$_2$—CX$_2$H; and —CX$_2$CX$_3$.

The halo group of each pendent halo-substituted group is, with some embodiments, independently selected from fluorine, chlorine, bromine and/or iodine. With some further embodiments, each halo group of each pendent halo-substituted group is independently selected from fluorine, chlorine and/or bromine. With some additional embodiments, each halo group of each pendent halo-substituted group is independently selected from fluorine and/or chlorine. In accordance with some further additional embodiments of the present invention, the halo group of each pendent halo-substituted group is fluorine.

The pi-conjugation extending group bonded to the 6-position, the 7-position, and/or the 11-position of the indeno-fused naphthopyran represented by Formula (I) is, with some embodiments, in each case independently represented by the following Formula (II') or Formula (III):

$$—C(R_{30})=C(R_{31})(R_{32}) \quad (II')$$

or

$$—C\equiv C—R_{33} \quad (III)$$

With reference to Formula (II') and Formula (III), $R_{30}$, $R_{31}$ and $R_{32}$ are each independently, amino, dialkyl amino, diaryl amino, acyloxy, acylamino, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, halogen, hydrogen, hydroxy, oxygen, a polyol residue, a substituted or unsubstituted phenoxy, a substituted or unsubstituted benzyloxy, a substituted or unsubstituted alkoxy, a substituted or unsubstituted oxyalkoxy, alkylamino, mercapto, alkylthio, a substituted or unsubstituted aryl, a substituted or unsubstituted heteroaryl, a substituted or unsubstituted heterocyclic group.

In accordance with some embodiments, when the pi-conjugation extending group, that is bonded to the 6-position, the 7-position, and/or the 11-position of the indeno-fused naphthopyran represented by Formula (I), includes at least one pendent halo-substituted group bonded thereto, there is the proviso with regard to Formulas (II') and (III), that at least one of $R_{30}$, $R_{31}$ and $R_{32}$ is the pendent halo-substituted group, and $R_{33}$ is the pendent halo-substituted group.

The pendent halo-substituted group of the pi-conjugation extending group bonded to the 6-position, the 7-position, and/or the 11-position of said indeno-fused naphthopyran represented by Formula (I) is, with some embodiments, selected from halo-substituted($C_1$-$C_{10}$)alkyl, halo-substituted($C_2$-$C_{10}$)alkenyl, halo-substituted($C_2$-$C_{10}$)alkynyl, halo-substituted($C_1$-$C_{10}$)alkoxy and halo-substituted($C_3$-$C_{10}$)cycloalkyl. The halo group of each pendent halo-substituted group is, with some embodiments, independently selected from fluorine, chlorine, bromine and iodine.

Examples of pendent halo-substituted($C_1$-$C_{10}$)alkyls include, but are not limited to, halo-substituted methyl, halo-substituted ethyl, linear or branched halo-substituted propyl, linear or branched halo-substituted butyl, linear or branched halo-substituted pentyl, linear or branched halo-substituted hexyl, linear or branched halo-substituted heptyl, linear or branched halo-substituted octyl, linear or branched halo-substituted nonyl, and linear or branched halo-substituted decyl. Examples of pendent halo-substituted($C_2$-$C_{10}$) alkenyls include, but are not limited to, halo-substituted ethenyl, linear or branched halo-substituted propenyl, linear or branched halo-substituted butenyl, linear or branched halo-substituted pentenyl, linear or branched halo-substituted hexenyl, linear or branched halo-substituted heptenyl, linear or branched halo-substituted octenyl, linear or branched halo-substituted nonenyl, and linear or branched halo-substituted decenyl. Examples of pendent halo-substituted ($C_2$-$C_{10}$)alkynyls, include, but are not limited to, halo-substituted ethynyl, linear or branched halo-substituted propynyl, linear or branched halo-substituted butynyl, linear or branched halo-substituted pentynyl, linear or branched halo-substituted hexynyl, linear or branched halo-substituted heptynyl, linear or branched halo-substituted octynyl, linear or branched halo-substituted nonynyl, and linear or branched halo-substituted decynyl. Examples of pendent halo-substituted($C_1$-$C_{10}$)alkoxys include, but are not limited to, halo-substituted methylalkoxy, halo-substituted ethylaclkoxy, linear or branched halo-substituted propylalkoxy, linear or branched butylalkoxy, linear or branched pentylalkoxy, linear or branched hexylalkoxy, linear or branched heptylalkoxy, linear or branched octylalkoxy, linear or branched nonylalkoxy and linear or branched decylalkoxy. Examples of pendent halo-substituted($C_3$-$C_{10}$)cycloalkyls include, but are not limited to, halo-substituted cyclopropyl, halo-substituted cyclobutyl, halo-substituted cyclopentyl, halo-substituted cyclohexyl, halo-substituted cycloheptyl, halo-substituted cyclooctyl, halo-substituted cyclononyl and halo-substituted cyclodecyl.

The pi-conjugation extending group bonded to the 6-position, the 7-position, and/or the 11-position of the indeno-fused naphthopyran represented by Formula (I) is in each case independently, with some embodiments: substituted or unsubstituted aryl; or substituted or unsubstituted heteroaryl.

Examples of aryl groups from which the substituted or unsubstituted aryl group can be selected, include, but are not limited to, phenyl, naphthyl, fluorenyl, anthracenyl and phenanthracenyl. With some embodiments of the present invention, the pi-conjugation extending group bonded to the 6-position, the 7-position, and/or the 11-position of the indeno-fused naphthopyran is independently selected from substituted and unsubstituted phenyl. Examples of heteroaryl groups from which the substituted or unsubstituted heteroaryl group can be selected, include, but are not limited to, pyridyl, quinolinyl, isoquinolinyl, bipyridyl, pyridazinyl, cinnolinyl, phthalazinyl, pyrimidinyl, quinazolinyl, pyrazinyl, quinoxalinyl, phenanthrolinyl, triazinyl, pyrrolyl, indolyl, furfuryl, benzofurfuryl, thienyl, benzothienyl, pyrazolyl, indazolyl, imidazolyl, benzimidazolyl, triazolyl, benzotriazolyl, tetrazolyl, oxazolyl, benzoxazolyl, isoxazolyl, benzisoxazolyl, thiazolyl, benzothiazolyl, isothiazolyl, benzisothiazolyl, thiadiazolyl, benzothiadiazolyl, thiatriazolyl, purinyl, carbazolyl and azaindolyl.

With some embodiments, the substituted or unsubstituted aryl and substituted or unsubstituted heteroaryl bonded to the 6-position, the 7-position, and/or the 11-position of the indeno-fused naphthopyran represented by Formula (I) each independently include a pendent halo-substituted group, which can be selected from one or more pendent halo-substituted groups as described previously herein.

The substituted aryl and said substituted heteroaryl, bonded to the 6-position, the 7-position, and/or the 11-position of the indeno-fused naphthopyran represented by Formula (I), are in each case, with some embodiments, independently substituted with at least one member selected from the group consisting of substituted or unsubstituted alkyl, substituted or unsubstituted alkoxy, substituted or unsubstituted oxyalkoxy, amide, substituted or unsubstituted amino, substituted or unsubstituted aryl, substituted or unsubstituted heteroaryl, azide, carbonyl, carboxy, ester, ether, halogen, hydroxy, polyol residue, substituted or unsubstituted phenoxy, substituted or unsubstituted benzyloxy, cyano, nitro, sulfonyl, thiol, substituted or unsubstituted heterocyclic group, provided that if the aryl group or the heteroaryl group comprises more than one substituent, each substituent is independently chosen.

In accordance with some additional embodiments, the indeno-fused naphthopyran represented by Formula (I) is free of a pi-conjugation extending group bonded to the 6-position and the 7-position, and the indeno-fused naphthopyran represented by Formula (I) further includes an ether group bonded to the 6-position and/or the 7-position of the indeno-fused naphthopyran. The ether group bonded to the 6-position and/or the 7-position of the indeno-fused naphthopyran, with some embodiments, is in each case independently represented by the following Formula (IV):

$$—OR_8' \qquad (IV)$$

With reference to Formula (IV), $R_8'$ is, with some embodiments, phenyl($C_1$-$C_3$)alkyl, $C_1$-$C_6$ alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl.

With further reference to Formula (IV), and in accordance with some embodiments, $R_8'$ is the group, —CH($R_9'$)Q, wherein $R_9'$ is hydrogen or $C_1$-$C_3$ alkyl, and Q is —CN, —$CF_3$ or —COO$R_{10}'$, wherein $R_{10}'$ is hydrogen or $C_1$-$C_3$ alkyl.

In accordance with some additional embodiments, the ether group bonded to the 6-position and/or the 7-position of the indeno-fused naphthopyran represented by Formula (I), is in each case independently selected from linear or branched $C_1$-$C_6$ alkyl ether. For example, $R_8$ of Formula (III) with some embodiments, is selected from methyl, ethyl, linear or branched propyl, linear or branched butyl, linear or branched pentyl and linear or branched hexyl. With some further embodiments of the present invention, $R_8$ of Formula (III) is selected from linear or branched $C_1$-$C_3$ alkyl (e.g., methyl, ethyl and linear or branched propyl).

In accordance with some additional embodiments, the indeno-fused naphthopyran represented by Formula (I) is free of a pi-conjugation extending group bonded to the 6-position and the 7-position of the indeno-fused naphthopyran, and the indeno-fused naphthopyran further includes an amino group bonded to the 6-position and/or the 7-position of the indeno-fused naphthopyran.

The indeno-fused naphthopyran represented by Formula (I), with some embodiments is free of a pi-conjugation extending group bonded to the 6-position and the 7-position, and further includes, in addition to the pi-conjugation extending group bonded to the 11-position thereof, as described previously herein: (i) an ether group bonded to the 6-position thereof, as described previously herein; and/or (ii) an amino group bonded to the 7-position thereof, as described above and in further detail herein below.

The indeno-fused naphthopyran represented by Formula (I), with some further embodiments is free of a pi-conjugation extending group bonded to the 6-position and the 7-position thereof, and the indeno-fused naphthopyran further includes an amino group bonded to the 6-position and/or the 7-position thereof (in addition to a pi-conjugation extending group bonded to the 11-position thereof).

The amino group bonded to the 6-position and/or the 7-position of the indeno-fused naphthopyran represented by Formula (I), with some embodiments, is in each case independently selected from the following groups of amino groups (1), (2), and (3).

With some embodiments, the amino group bonded to the 6-position and/or the 7-position of the indeno-fused naphthopyran represented by Formula (I) is independently chosen from (1) —N($R_{15}$)$R_{16}$ wherein $R_{15}$ and $R_{16}$ are each selected from the group consisting of hydrogen provided that only one of $R_{15}$ and $R_{16}$ is hydrogen, $C_1$-$C_8$ alkyl, phenyl, naphthyl, heteroaromatic groups, furanyl, benzofuran-2-yl, benzofuran-3-yl, thienyl, benzothien-2-yl, benzothien-3-yl, dibenzofuranyl, dibenzothienyl, benzopyridyl and fluorenyl, $C_1$-$C_8$ alkylaryl, $C_3$-$C_{20}$ cycloalkyl, $C_4$-$C_{20}$ bicycloalkyl, $C_5$-$C_{20}$ tricycloalkyl and $C_1$-$C_{20}$ alkoxyalkyl, wherein said aryl group is phenyl or naphthyl.

The amino group bonded to the 6-position and/or the 7-position of the indeno-fused naphthopyran represented by Formula (I) is, with some embodiments, independently chosen from (2) a nitrogen containing ring represented by the following Formula (V),

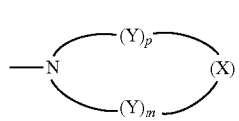

(V)

With reference to Formula (V), Y is independently selected for each p and each m from the group consisting of —$CH_2$—, —CH($R_{17}$)—, —C($R_{17}$)($R_{17}$)—, —CH(aryl)-, —C(aryl)$_2$-, and —C($R_{17}$)(aryl)-, and X is selected from the group consisting of —Y—, —O—, —S—, —S(O)—, —S($O_2$)—, —NH—, —N$R_{17}$— and —N-aryl, wherein $R_{17}$ is in each instance independently selected from $C_1$-$C_6$ alkyl, said aryl substituent is phenyl or naphthyl, m is the integer 1, 2 or 3, and p is the integer 0, 1, 2, or 3, provided that when p is 0, X is Y.

The amino group bonded to the 6-position and/or the 7-position of the indeno-fused naphthopyran represented by Formula (I) is, with some additional embodiments, independently chosen from (3) a group represented by the following Formulas (VI) and (VII):

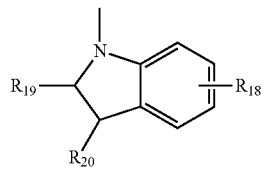

(VI)

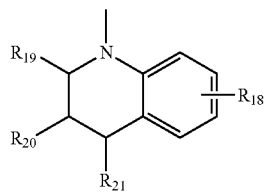

(VII)

With reference to Formulas (VI) and (VII), $R_{19}$, $R_{20}$ and $R_{21}$ are each hydrogen, $C_1$-$C_5$ alkyl, phenyl or naphthyl, or the groups $R_{19}$ and $R_{20}$ together form a ring of 5 to 8 carbon atoms, and $R_{18}$ is $C_1$-$C_6$ alkyl, $C_{1-6}$ alkoxy, fluoro or chloro.

With some embodiments of the present invention, the amino group bonded to the 6-position and/or the 7-position of the indeno-fused naphthopyran represented by Formula (I) is independently represented by the following Formulas-(VIII) and -(IX).

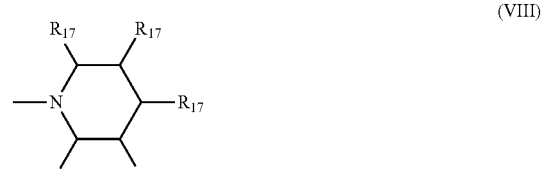

(VIII)

(IX)

With reference to Formulas-(XI) and -(XII), $R_{17}$ is in each instance independently selected from hydrogen or $C_1$-$C_6$ alkyl, and correspondingly, the amino group bonded to the 6-position and/or the 7-position of the indeno-fused naphthopyran is independently selected from substituted or unsubstituted piperidenyl (e.g., Formula-XI), and substituted or unsubstituted morpholinyl (e.g., Formula-XII).

In accordance with some further embodiments, the amino group bonded to the 6-position and/or the 7-position of the indeno-fused naphthopyran represented by Formula (I) is independently selected from substituted and unsubstituted piperidenyl, such as represented by Formula (VIII).

The 13-position of the indeno-fused naphthopyran represented by Formula (I) is free of spiro-substituents (i.e., free of spiro-cyclic groups), with some embodiments. The 13-position of the indeno-fused naphthopyran being "free of spiro-substituents" means that if the 13-position of the indeno-fused naphthopyran is di-substituted, the substituent groups do not together form a spiro group (i.e., a spiro-cyclic group). As used herein the phrase "free of spiro-cyclic groups at the 13-position" means that if the 13-position of the indeno-fused naphthopyran is di-substituted, the substituent groups do not together form a spiro-cyclic group.

With some embodiments of the present invention, the 5-, 8-, 9-, 10-, and 12-positions of the indeno-fused naphthopyran represented by Formula (I) each independently have bonded thereto hydrogen, hydrocarbyl, or substituted hydrocarbyl, each independently and optionally interrupted with at least one of —O—, —S—, —C(O)—, —C(O)O—, —S(O)—, —$SO_2$—, —N═N—, —N($R_{11}$')— where $R_{11}$' is selected from hydrogen, hydrocarbyl or substituted hydrocarbyl, —Si(O$R_8$')$_w$($R_8$')$_t$—, where w and t are each independently selected from 0 to 2, provided that the sum of w and t is 2, and each $R_8$' is independently selected from hydrogen, hydrocarbyl and substituted hydrocarbyl, and combinations of two or more thereof.

With some further embodiments of the present invention, the 5-, 8-, 9-, 10-, and 12-positions of the indeno-fused naphthopyran represented by Formula (I) each independently have bonded thereto hydrogen; $C_1$-$C_6$ alkyl; chloro;

fluoro; $C_3$-$C_7$ cycloalkyl; a substituted or unsubstituted phenyl, the phenyl substituents being $C_1$-$C_6$ alkyl or $C_1$-$C_6$ alkoxy; —$OR_{10}'$ or —$OC(=O)R_{10}'$ wherein $R_{10}'$ is S, hydrogen, amine, $C_1$-$C_6$ alkyl, phenyl($C_1$-$C_3$)alkyl, mono ($C_1$-$C_6$)alkyl substituted phenyl($C_1$-$C_3$)alkyl, mono($C_1$-$C_6$) alkoxy substituted phenyl($C_1$-$C_3$)alkyl, ($C_1$-$C_6$)alkoxy($C_2$-$C_4$)alkyl, $C_3$-$C_7$ cycloalkyl or mono($C_1$-$C_4$)alkyl substituted $C_3$-$C_7$ cycloalkyl; or —$N(R_{11}')R_{12}'$, wherein $R_{11}'$ and $R_{12}'$ are each independently hydrogen, $C_1$-$C_8$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl and fluorenyl, $C_1$-$C_8$ alkylaryl, $C_3$-$C_{20}$ cycloalkyl, $C_4$-$C_{20}$ bicycloalkyl, $C_5$-$C_{20}$ tricycloalkyl or $C_1$-$C_{20}$ alkoxyalkyl, or $R_{11}'$ and $R_{12}'$ come together with the nitrogen atom to form a $C_3$-$C_{20}$ hetero-bicycloalkyl ring or a $C_4$-$C_{20}$ hetero-tricycloalkyl ring.

The 5-, 8-, 9-, 10-, and 12-positions of the indeno-fused naphthopyran represented by Formula (I) each independently have bonded thereto, with some embodiments, hydrogen; or a nitrogen containing ring represented by Formula (V) as described previously herein.

The 13-position of the indeno-fused naphthopyran represented by Formula (I), with some embodiments, has bonded thereto two groups which are each independently chosen from: hydrogen; hydroxy; $C_1$-$C_6$ alkyl; $C_3$-$C_7$ cycloalkyl; allyl; a substituted or unsubstituted phenyl or benzyl, wherein each of said phenyl and benzyl substituents is independently $C_1$-$C_6$ alkyl or $C_1$-$C_6$ alkoxy; chloro; fluoro; a substituted or unsubstituted amino; —$C(O)R_9'$ wherein $R_9'$ is hydrogen, hydroxy, $C_1$-$C_6$ alkyl, $C_1$-$C_6$ alkoxy, an unsubstituted, mono- or di-substituted phenyl or naphthyl wherein each of said substituents is independently $C_1$-$C_6$ alkyl or $C_1$-$C_6$ alkoxy, phenoxy, mono- or di-($C_1$-$C_6$)alkyl substituted phenoxy, mono- or di-($C_1$-$C_6$)alkoxy substituted phenoxy, amino, mono- or di-($C_1$-$C_6$)alkylamino, phenylamino, mono- or di-($C_1$-$C_6$)alkyl substituted phenylamino or mono- or di-($C_1$-$C_6$)alkoxy substituted phenylamino; and —$OR^{18}$ wherein $R^{18}$ is $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_6$ chloroalkyl, $C_1$-$C_6$ fluoroalkyl, allyl or —$CH(R^{19})T$ wherein $R^{19}$ is hydrogen or $C_1$-$C_3$ alkyl, T is CN, $CF_3$ or $COOR^{20}$ wherein $R^{20}$ is hydrogen or $C_1$-$C_3$ alkyl, or wherein $R^{18}$ is —$C(=O)U$ wherein U is hydrogen, $C_1$-$C_6$ alkyl, $C_1$-$C_6$ alkoxy, an unsubstituted, mono- or di-substituted phenyl or naphthyl, wherein each of said substituents are independently $C_1$-$C_6$ alkyl or $C_1$-$C_6$ alkoxy, phenoxy, mono- or di-($C_1$-$C_6$)alkyl substituted phenoxy, mono- or di-($C_1$-$C_6$)alkoxy substituted phenoxy, amino, mono- or di-($C_1$-$C_6$)alkylamino, phenylamino, mono- or di-($C_1$-$C_6$)alkyl substituted phenylamino or mono- or di-($C_1$-$C_6$)alkoxy substituted phenylamino. With some further embodiments, the two groups bonded to position-13 together form an oxo group.

The 3-position of the indeno-fused naphthopyran represented by Formula (I), with some embodiments, has bonded thereto a B group and a B' group, which are each independently chosen from, with some embodiments, from: hydrogen; an unsubstituted, mono-, di- or tri-substituted aryl group; 9-julolidinyl; an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl and fluorenyl. The aryl and heteroaromatic substituents are, with some embodiments, each independently selected from: hydroxy, aryl, mono- or di-($C_1$-$C_{12}$)alkoxyaryl, mono- or di-($C_1$-$C_{12}$)alkylaryl, haloaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_{12}$)alkyl, $C_3$-$C_7$ cycloalkyloxy($C_1$-$C_{12}$)alkoxy, aryl($C_1$-$C_{12}$)alkyl, aryl($C_1$-$C_{12}$)alkoxy, aryloxy, aryloxy($C_1$-$C_{12}$)alkyl, aryloxy($C_1$-$C_{12}$)alkoxy, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, mono- or di-($C_1$-$C_{12}$)alkylaryl($C_1$-$C_{12}$)alkoxy, mono- or di-($C_1$-$C_{12}$)alkoxyaryl($C_1$-$C_{12}$)alkoxy, amino, mono- or di-($C_1$-$C_{12}$)alkylamino, diarylamino, piperazino, N—($C_1$-$C_{12}$) alkylpiperazino, N-arylpiperazino, aziridino, indolino, piperidino, morpholino, thiomorpholino, tetrahydroquinolino, tetrahydroisoquinolino, pyrrolidyl, $C_1$-$C_{12}$ alkyl, $C_1$-$C_{12}$ haloalkyl, $C_1$-$C_{12}$ alkoxy, mono($C_1$-$C_{12}$)alkoxy($C_1$-$C_{12}$)alkyl, acryloxy, methacryloxy, halogen, or —$C(=O)R^{21}$ wherein $R^{21}$ is —$OR^{22}$, —$N(R^{23})R^{24}$, piperidino or morpholino, wherein $R^{22}$ is allyl, $C_1$-$C_6$ alkyl, phenyl, mono ($C_1$-$C_6$)alkyl substituted phenyl, mono($C_1$-$C_6$)alkoxy substituted phenyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl or $C_1$-$C_6$ haloalkyl, and $R^{23}$ and $R^{24}$ are each independently $C_1$-$C_6$ alkyl, $C_5$-$C_7$ cycloalkyl or a substituted or unsubstituted phenyl, the phenyl substituents independently being $C_1$-$C_6$ alkyl or $C_1$-$C_6$ alkoxy.

The B and B' groups bonded to position-3 of the indeno-fused naphthopyran represented by Formula-(I), with some further embodiments, are each independently selected from: hydrogen; and an unsubstituted or mono-substituted group chosen from pyrazolyl, imidazolyl, pyrazolinyl, imidazolinyl, pyrrolinyl, phenothiazinyl, phenoxazinyl, phenazinyl and acridinyl, the substituents being $C_1$-$C_{12}$ alkyl, $C_1$-$C_{12}$ alkoxy, phenyl or halogen; and a mono-substituted phenyl, in which the phenyl has a substituent located at the para position thereof, the substituent being a dicarboxylic acid residue or derivative thereof, a diamine residue or derivative thereof, an amino alcohol residue or derivative thereof, a polyol residue or derivative thereof, —$(CH_2)$—, —$(CH_2)_t$— or —$[O—(CH_2)_t]_k$—, wherein "t" may range form 2 to 6 and "k" may range from 1 to 50, wherein the substituent may be connected to an aryl group on another photochromic material.

The B and B' groups bonded to position-3 of the indeno-fused naphthopyran represented by Formula-(I), with some further embodiments, are each independently selected from; hydrogen; and a group represented by the following general formulas (X) and/or (XI):

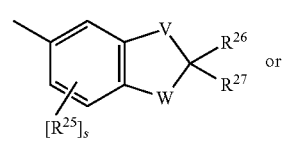
(X)

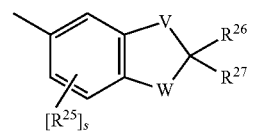
(XI)

With reference to formulas (X) and (XI) above, and in accordance with some embodiments, V represents —$CH_2$— and —O—. Examples of groups that W can represent, with some embodiments, include oxygen and substituted nitrogen, provided that if W is a substituted nitrogen, V is —CH$_2$—. Non-limiting examples of nitrogen substituents include hydrogen, C$_1$-C$_{12}$ alkyl and C$_1$-C$_{12}$ acyl. With some further embodiments, "s" can range from 0 to 2, and, if s is greater than one, each group represented by R$^{25}$ can be the same as or different from one or more other R$^{25}$ groups. Non-liming examples of groups that R$^{25}$ represents include C$_1$-C$_{12}$ alkyl, C$_1$-C$_{12}$ alkoxy, hydroxy and halogen. Non-limiting examples of groups that R$^{26}$ and R$^{27}$ represent, with some embodiments, include hydrogen and C$_1$-C$_{12}$ alkyl.

The B and B' groups bonded to position-3 of the indeno-fused naphthopyran represented by Formula-(I) with some further embodiments are each independently selected from: hydrogen; and a group represented by the following Formula (XII):

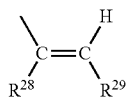

(XII)

With reference to Formula (XII) above, R$^{28}$ is chosen from, with some embodiments, hydrogen and C$_1$-C$_{12}$ alkyl. The R$^{29}$ group of Formula (XII) is chosen from, with some embodiments, an unsubstituted, mono- or di-substituted naphthyl, phenyl, furanyl or thienyl, said substituents being C$_1$-C$_{12}$ alkyl, C$_1$-C$_{12}$ alkoxy or halogen.

The B and B' groups bonded to position-3 of the indeno-fused naphthopyran represented by Formula-(I), with some embodiments, together form a fluoren-9-ylidene group, or a mono- or di-substituted fluoren-9-ylidene group. Each of the fluoren-9-ylidene substituents are, with some embodiments, independently selected from C$_1$-C$_{12}$ alkyl, C$_1$-C$_{12}$ alkoxy, or halogen.

In accordance with some embodiments, the indeno-fused naphthopyrans represented by Formula (I) are chosen from one or more indeno-fused naphthopyrans represented by the following Formulas (I-1) through (I-7), and combinations of two or more thereof:

3,3-bis-(4-methoxyphenyl)-6-methoxy-7-piperidino-11-(4-trifluoromethyl)phenyl-13,13-dimethyl-3H,13H-indeno[2,1-f]naphtho[1,2-b]pyran, which is represented by the following Formula (I-1),

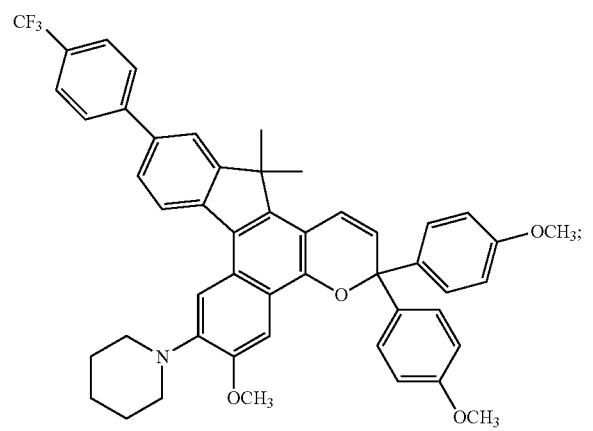

(I-1)

3-(4-methoxyphenyl)-3-(4-morpholinophenyl)-6-methoxy-7-piperidino-11-phenyl-13,13-dimethyl-3H, 13H-indeno[2,1-f]naphtho[1,2-b]pyran, which is represented by the following Formula (I-2),

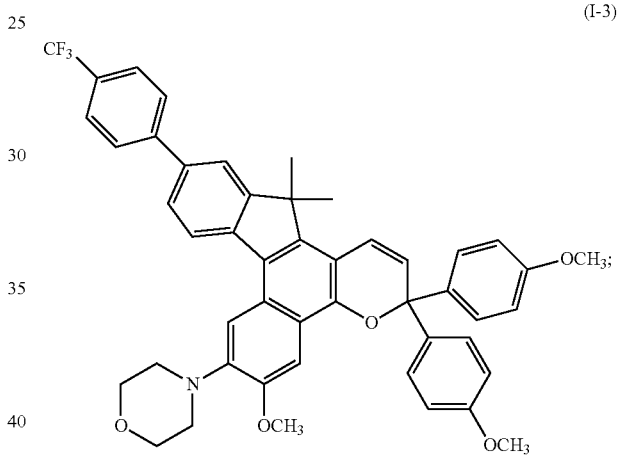

(I-2)

3,3-bis-(4-methoxyphenyl)-6-methoxy-7-morpholino-1-(4-trifluoromethyl)phenyl-13,13-dimethyl-3H, 13H-indeno[2,1-f]naphtho[1,2-b]pyran, which is represented by the following Formula (I-3), (I-3)

3,3-bis-(4-methoxyphenyl)-6,7-dimethoxy-11-(4-trifluoromethyl)phenyl-13,13-dimethyl-3H,13H-indeno[2,1-f]naphtho[1,2-b]pyran, which is represented by the following Formula (I-4),

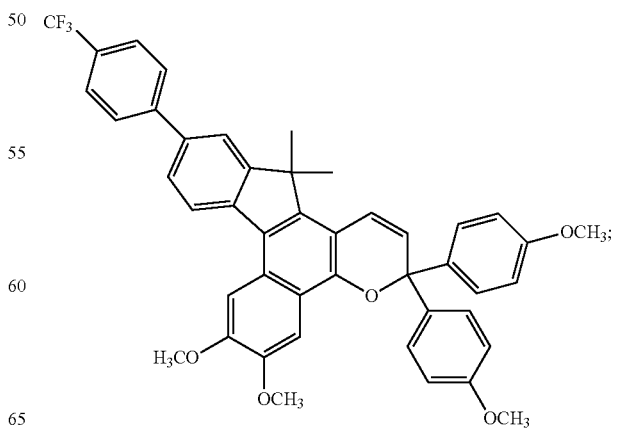

(I-4)

3-(4-methoxyphenyl)-3-(4-morpholinophenyl)-6-methoxy-7-piperidino-11-(2-trifluoromethyl)phenyl-13,13-dimethyl-3H,13H-indeno[2,1-f]naphtho[1,2-b]pyran, which is represented by the following Formula (I-5),

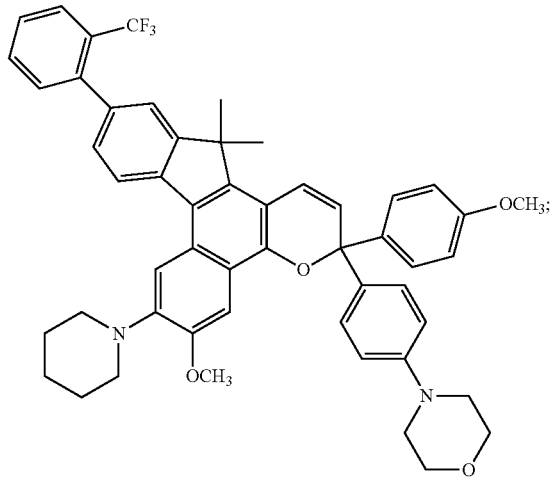

(I-5)

3-(4-butoxyphenyl)-3-(4-methoxyphenyl)-7-methoxy-11-phenyl-13,13-dimethyl-3H,13H-indeno[2,1-f]naphtho[1,2-b]pyran, which is represented by the following Formula (I-6),

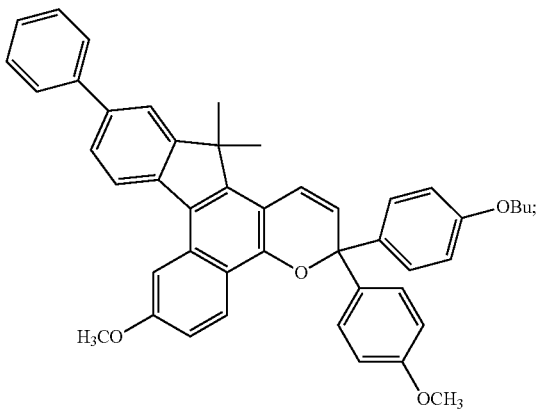

(I-6)

and 3-(4-(2-(((1,1,1,5,5,5-hexamethyl-3-(((trimethylsilyl)oxy)trisiloxan-3-yl)oxy)ethoxy)phenyl)-3-(4-morpholinophenyl)-7-methoxy-11-phenyl-13,13-dimethyl-3H,13H indeno[2,1-f]naphtho[1,2-b]pyran, which is represented by the following Formula (I-7),

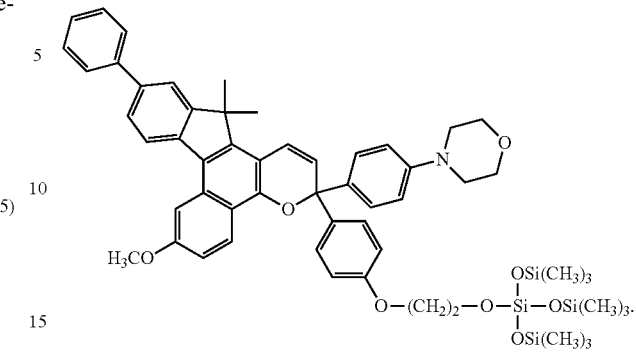

(I-7)

In accordance with some embodiments of the present invention, the photochromic compound, of the photochromic coating layer, includes a reaction product of: (a) at least one ring-opening cyclic monomer chosen from a cyclic ester, a cyclic carbonate, and combinations thereof; and (b) a photochromic initiator.

With some embodiments, the cyclic ester from which the ring-opening cyclic monomer can be selected is represented by the following Formula (XIII) and the cyclic carbonate from which the ring-opening cyclic monomer can be selected is represented by the following Formula (XIV):

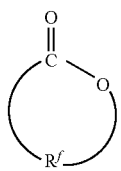

(XIII)

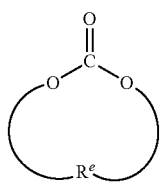

(XIV)

With reference to Formula (XIII) and Formula (XIV), $R^f$ and $R^e$ are each independently selected from divalent hydrocarbyl and substituted divalent hydrocarbyl, each optionally interrupted with at least one —O—. With some embodiments there is the proviso that any such optional interrupting divalent —O—: (i) is not bonded to a carbonyl carbon in the case of Formula (XIII); and (ii) is not bonded to another oxygen in the case of both of Formula (XIII) and Formula (XIV). With some further embodiments, $R^f$ and $R^e$ are each independently selected from optionally substituted divalent linear or branched $C_2$-$C_{20}$ alkyl, or optionally substituted divalent linear or branched $C_2$-$C_{10}$ alkyl, or optionally substituted divalent linear or branched $C_2$-$C_5$ alkyl, where the optional substituents are independently selected from those substituents as described previously herein with regard to substituted hydrocarbyl groups.

Additional examples of cyclic esters and cyclic carbonates from which the ring-opening cyclic monomer can be selected include, but are not limited to, those described in column 10, line 47 through column 11, line 47 of U.S. Pat. No. 7,465,415, which disclosure is incorporated herein by reference.

Each ring-opening cyclic monomer (a), that is reacted with the photochromic initiator (b), with some embodiments, is chosen from a cyclic ester, and each cyclic ester is chosen from epsilon-caprolactone, delta-valerolactone, and combinations thereof.

The photochromic initiator (b) includes, with some embodiments, at least one functional group that is adapted to initiate ring-opening of the at least one ring-opening cyclic monomer (a). In accordance with some further embodiments, each functional group of the photochromic initiator (b) is chosen from an alcohol, an amine, a carboxylic acid, a silanol, a thiol, salts thereof, and combinations thereof.

Each functional group of the photochromic initiator (b), with some embodiments, is chosen from a primary alcohol group, a secondary alcohol group, salts thereof, and combinations thereof.

The photochromic initiator (b), with some embodiments, is chosen from the indeno-fused naphthopyran represented by Formula (I) above, which further includes at least one functional group that is adapted to initiate ring-opening of the at least one ring-opening cyclic monomer (a).

In accordance with some further embodiments, the photochromic coating layer includes at least one photochromic compound, which includes at least one ring-opened group represented by the following Formula (II),

(II)

In accordance with some additional embodiments, the photochromic coating layer includes at least one indeno-fused napthopyran represented by Formula (I), which further includes at least one ring-opened group represented by Formula (II) above.

Independently for each ring-opened group represented by Formula (II): $L^1$ is a bond or a multivalent hydrocarbyl group or a multivalent substituted hydrocarbyl group, each optionally interrupted with at least one of —O—, —S—, —C(O)—, —C(O)O—, —OC(O)O—, —S(O)—, —SO$_2$—, —N(R$^9$)— and —Si(R$^9$)(R$^{10}$)— wherein $R^9$ and $R^{10}$ are each independently selected from hydrocarbyl and substituted hydrocarbyl, and combinations of two or more thereof; $L^2$, independently for each t, is chosen from —O—, —N(R$^b$)—, and —S—, wherein R$^b$, independently for each t, is chosen from hydrogen, hydrocarbyl, and substituted hydrocarbyl; R$^a$, independently for each s, is chosen from a ring-opened cyclic ester monomer and a ring-opened cyclic carbonate monomer; E, independently for each t, is chosen from hydrogen, hydrocarbyl and substituted hydrocarbyl each optionally interrupted with at least one of —O—, —S—, —C(O)—, —C(O)O—, —OC(O)O—, —S(O)—, —SO$_2$—, —N(R$^9$)— and —Si(R$^9$)(R$^{10}$)— wherein R$^9$ and R$^{10}$ are each independently selected from hydrocarbyl and substituted hydrocarbyl, and combinations of two or more thereof; subscript s, independently for each t, is from 1 to 500, or from 1 to 300, or from 1 to 200, or from 1 to 150, or from 1 to 100, or from 1 to 50, or from 1 to 25; and subscript t is from 1 to 20, or from 1 to 15, or from 1 to 10, or from 1 to 5, or from 1 to 3.

Each ring-opened group represented by Formula (II) is, with some further embodiments, independently bonded to at least one of the 3-position, the 5-position, the 8-position, the 9-position, the 10-position, the 12-position, and/or the 13-position of the indeno-fused naphthopyran represented by Formula (I). Each ring-opened group represented by Formula (II) is, with some additional embodiments, independently bonded to at least one of the 3-position, the 5-position, the 6-position, the 7-position, the 8-position, the 9-position, the 10-position, the 11-position, the 12-position, and/or the 13-position of the indeno-fused naphthopyran represented by Formula (I); provided that a pi-conjugation extending group is bonded to at least one of the 6-position, the 7-position, and/or the 11-position of the indeno-fused naphthopyran represented by Formula (II).

With further reference to the ring-opened group represented by Formula (II), and in accordance with some embodiments, the multivalent groups from which $L^1$ is selected include, but are not limited to, multivalent versions (or forms) of those groups as described previously herein that can be bonded to the 3-position, the 5-position, the 8-position, the 9-position, the 10-position, the 12-position, and the 13-position of the indeno-fused naphthopyran represented by Formula (I).

With some embodiments, $L^1$ of Formula (II) is or includes one or more residues of: linear or branched $C_1$-$C_{20}$ alkylene oxide; poly(linear or branched $C_1$-$C_{20}$ alkylene oxide) having from 2 to 100, or from 2 to 50, or from 2 to 25, or from 2 to 10, or from 2 to 5 repeat units; glycerol; trimethylol propane; di-trimethylolpropane; pentaerythritol; di-pentaerythritol; and combinations of two or more thereof, including alternating combinations of two or more thereof.

With additional reference to the ring-opened group represented by Formula (II), and in accordance with some embodiments, R$^b$ of the divalent linking group —N(R$^b$)— from which $L^2$ can be selected, independently for each t is chosen from hydrogen, linear or branched $C_1$-$C_{20}$ alkyl, or linear or branched $C_1$-$C_{10}$ alkyl, or linear or branched $C_1$-$C_6$ alkyl.

With additional further reference to the ring-opened group represented by Formula (II), and in accordance with some embodiments, the ring-opened cyclic ester monomer and the ring-opened cyclic carbonate monomer from which R$^a$ can be independently selected for each s are formed from (or are ring-opened versions of) cyclic ester monomers represented by Formula (XIII) and cyclic carbonate monomers represented by Formula (XIV) as described previously herein.

With some embodiments, R$^a$ independently for each s is chosen from ring-opened epsilon-caprolactone and ring-opened delta-valerolactone.

With further reference to the ring-opened group represented by Formula (II), and in accordance with some embodiments, E, independently for each t, is chose from: hydrogen; (meth)acrylic acid ester; allyl ether; allyl carbonate; vinyl ether; vinyl carbonate; optionally substituted linear or branched $C_1$-$C_{20}$ alkyl; optionally substituted aryl; optionally substituted linear or branched $C_1$-$C_{20}$ carboxylic acid ester; optionally substituted aryl carboxylic acid ester; linear or branched $C_1$-$C_{20}$ alkyl ether; poly(linear or branched $C_1$-$C_{20}$ alkylene ether); optionally substituted linear or branched $C_1$-$C_{20}$ alkyl urethane; optionally substituted linear or branched $C_1$-$C_{20}$ alkyl thiourethane; optionally substituted aryl urethane; optionally substituted aryl thiourethane; and optionally substituted linear or branched $C_1$-$C_{20}$ alkyl trialkoxysilyl. The optional substituents of the groups from which E can be selected, with some embodiments, are each independently selected from those substituents as described previously herein with regard to substituted hydrocarbyl groups.

Photochromic compounds that include at least one ring-opened group represented by the following Formula (II) can, with some embodiments, be prepared in accordance with art-recognized methods. With some embodiments, photochromic compounds that include at least one ring-opened group represented by Formula (II) are prepared by reacting a photochromic initiator and a ring-opening cyclic monomer, each as described previously herein, in the presence of a catalytic amount of a catalyst. With some embodiments, the catalyst is chosen from aluminum isopropoxide, triethyl aluminum, tin(II)2-ethylhexanoate, trifluoro acetic acid, enzymes, potassium or an appropriate salt thereof, trifluoromethanesulfonic anhydride, and combinations thereof.

With some embodiments of the present invention, indeno-fused napthopyrans represented by Formula (I) that include at least one ring-opened group represented by Formula (II) that can be present in the photochromic coating layer include, but are not limited to, those represented by the following Formulas (XV-1) through (XV-6), and combinations of two or more thereof:

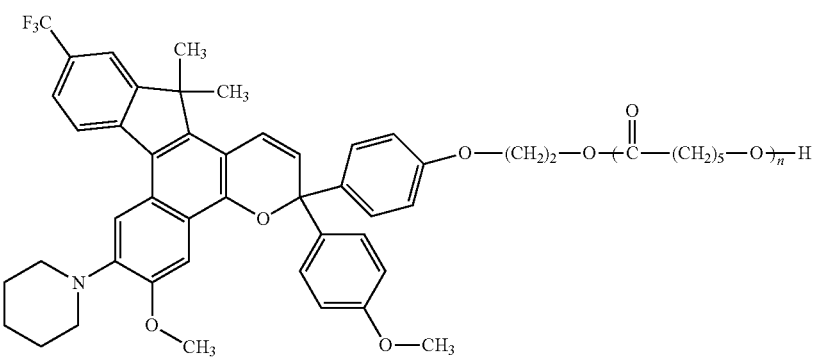

(XV-1)

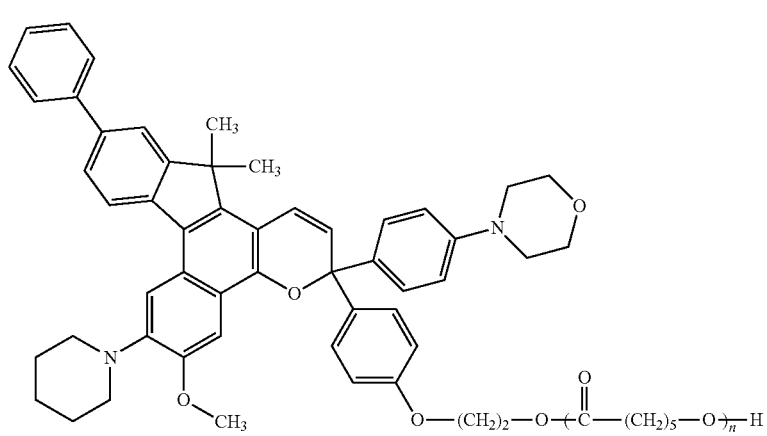

(XV-2)

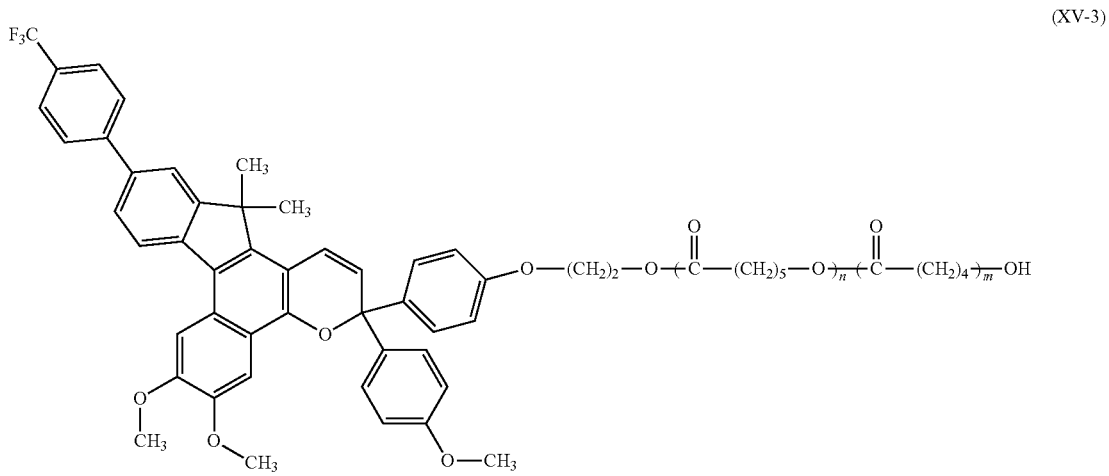

(XV-3)

-continued
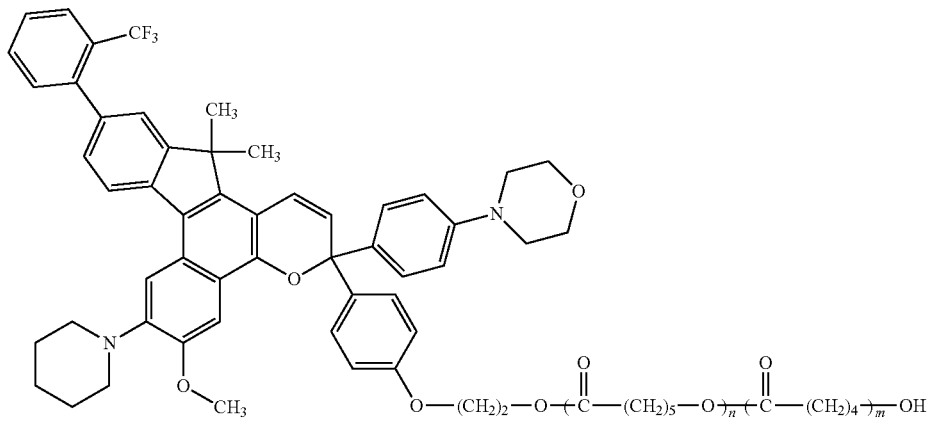
(XV-4)
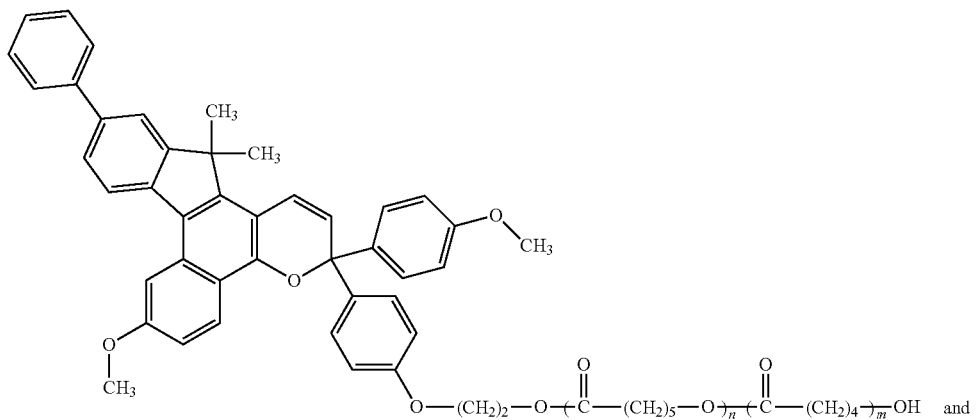
(XV-5)
and
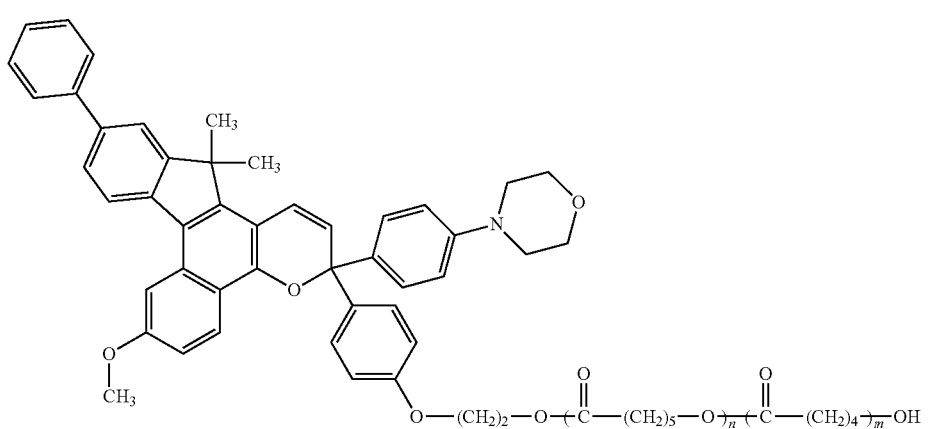
(XV-6)

With reference to Formulas (XV-1) through (XV-6), and in accordance with some embodiments, n and m are in each case independently greater than 0 and less than or equal to 100, such as from 5 to 100, or from 8 to 100, or from 10 to 100, or from 15 to 100, or from 20 to 100, or from 25 to 100, or from 30 to 100, or from 35 to 100, or from 40 to 100, or from 45 to 100, or from 50 to 100. With some embodiments the sum of n and m of Formulas (XV-1) through (XV-6) is in each case independently: less than or equal to 200; or less than or equal to 100.

With some embodiments, the photochromic material represented by Formula (XV-1) is prepared from one mole of a photochromic initiator represented by the following Formula (XV-1-i) and n moles of epsilon-caprolactone.

(XV-1-i)

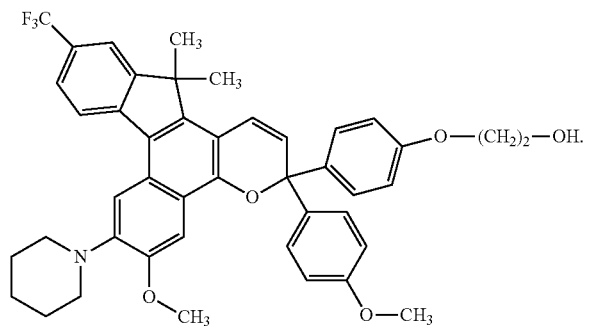

With some embodiments, the photochromic material represented by Formula (XV-2) is prepared from one mole of a photochromic initiator represented by the following Formula (XV-2-i) and n moles of epsilon-caprolactone.

(XV-2-i)

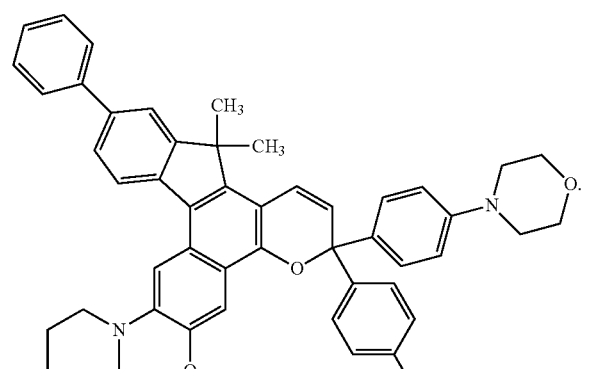

With some embodiments, the photochromic material represented by Formula (XV-3) is prepared from one mole of a photochromic initiator represented by the following Formula (XV-3-i) and n moles of epsilon-caprolactone, and then subsequently m moles of delta-valerolactone.

(XV-3-i)

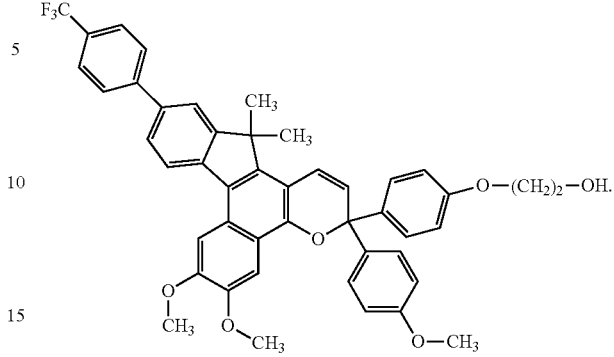

With some embodiments, the photochromic material represented by Formula (XV-4) is prepared from one mole of a photochromic initiator represented by the following Formula (XV-4-i) and n moles of epsilon-caprolactone, and then subsequently m moles of delta-valerolactone.

(XV-4-i)

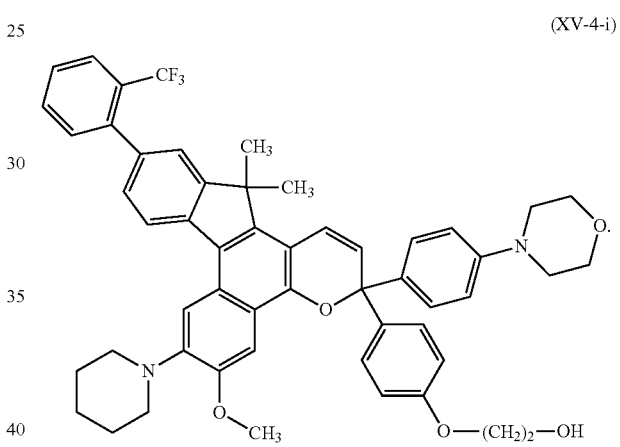

With some embodiments, the photochromic material represented by Formula (XV-5) is prepared from one mole of a photochromic initiator represented by the following Formula (XV-5-i) and n moles of epsilon-caprolactone, and then subsequently m moles of delta-valerolactone.

(XV-5-i)

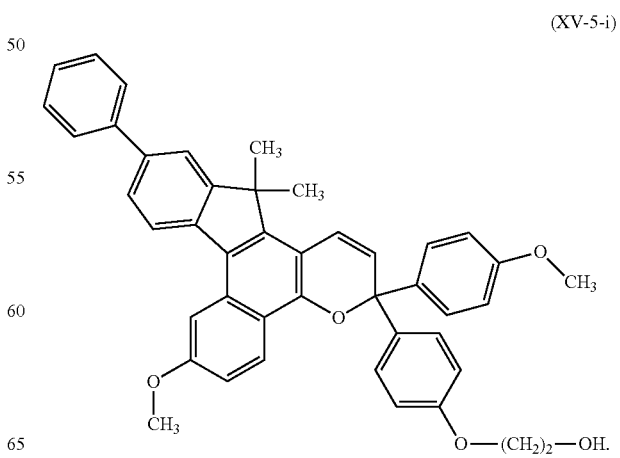

With some embodiments, the photochromic material represented by Formula (XV-6) is prepared from one mole of a photochromic initiator represented by the following Formula (XV-6-i) and n moles of epsilon-caprolactone, and then subsequently m moles of delta-valerolactone.

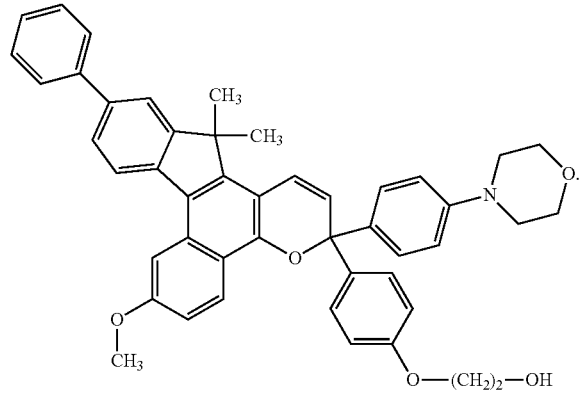

(XV-6-i)

In accordance with some embodiments of the present invention, forming the photochromic coating layer over at least a portion of the rear surface of the segmented multifocal finished lens includes: (i) applying a photochromic coating composition over at least a portion of the rear surface of the segmented multifocal finished lens, thereby forming an applied photochromic coating composition over at least the portion of the rear surface of the segmented multifocal finished lens; and converting the applied photochromic coating composition to the photochromic coating layer residing over at least said portion of said rear surface of the segmented multifocal finished lens.

The photochromic coating composition can be applied over at least a portion of the rear surface of the segmented multifocal finished lens by art-recognized methods. With some embodiments, the photochromic coating composition is applied by spray methods, curtain coating methods, spin coating methods, doctor (or draw-down) blade application methods, and combinations thereof.

The photochromic coating composition includes, with some embodiments: one or more photochromic compounds as described previously herein; a resin component; optionally one or more solvents; and optionally one or more additives. Examples of solvents include, but are not limited to, the following: propylene glycol monomethyl ether acetate and their derivates (sold as DOWANOL solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, N-methyl-2-pyrrolidone, 2-methoxyethyl ether, 3-propylene glycol methyl ether, and mixtures thereof. The solvent can be present in the photochromic coating composition, with some embodiments, in an amount of from 1 percent by weight to 95 percent by weight, or from 10 percent by weight to 75 percent by weight, or from 25 percent by weight to 60 percent by weight, in each case based on total weight of the coating composition.

The resin component of the photochromic coating composition can be a thermoplastic resin component, a curable resin component, or a combination thereof, with some embodiments. The thermoplastic resin component, with some embodiments, includes one or more thermoplastic polymers. Examples of thermoplastic polymers include, but are not limited to, thermoplastic poly(meth)acrylates, thermoplastic polyethers, thermoplastic polythioethers, thermoplastic polyesters, thermoplastic polyamides, thermoplastic polyurethanes, thermoplastic polythiourethanes, thermoplastic polyvinyls, thermoplastic polyolefins and combinations thereof.

When the resin component of the photochromic coating composition includes a thermoplastic resin component, converting the applied photochromic coating composition to the photochromic coating layer includes, with some embodiments, allowing the applied thermoplastic photochromic coating composition to solidify. Solidification of the applied thermoplastic photochromic coating composition includes, with some embodiments: (i) exposing the applied thermoplastic photochromic coating composition to elevated temperature to drive any solvent out of the applied composition; and/or (ii) cooling the applied thermoplastic photochromic coating composition to a temperature below the melting point of the thermoplastic resin, such as cooling to room temperature.

With some embodiments, the photochromic coating composition is a curable photochromic coating composition, and converting the applied photochromic coating composition to the photochromic coating layer includes curing the applied photochromic coating composition.

When the resin component of the photochromic coating composition is a curable resin component, and correspondingly the photochromic coating composition is a curable photochromic coating composition, the applied photochromic coating composition can be cured by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

In accordance with some embodiments, the photochromic coating composition is a curable photochromic coating composition, and the resulting photochromic coating layer includes an organic matrix that includes: (i) a polymer chosen from poly(meth)acrylates, polyethers, polythioethers, polyesters, polyamides, polyurethanes, polythiourethanes, polyvinyls, polyolefins, and combinations thereof; and (ii) a plurality of crosslink linkages chosen from ether linkages, sulfide linkages, carboxylic acid ester linkages, carbonate linkages (e.g., —O—C(O)—O—), urethane linkages (e.g., —N(H)—C(O)—O—), thiourethane linkages (e.g., —N(H)—C(O)—S—), siloxane linkages, carbon-carbon linkages, and combinations thereof. With some embodiments, carbon-carbon linkages are formed in the organic matrix of the photochromic coating layer by free radical reactions or free radical polymerization, such as in the case of actinic radiation curable coating compositions.

In accordance with some embodiments, the curable photochromic coating composition includes: a (meth)acrylate copolymer having active hydrogen functionality selected from hydroxyl, thiol, primary amine, secondary amine, and combinations thereof; optionally a polyol that is different than the (meth)acrylate copolymer; a polyisocyanate, such as a diisocyanate and/or a triisocyanate, each optionally blocked with a suitable blocking or leaving group, such as, 3,5-dimethyl pyrazole; optionally one or more solvents, as described previously herein; and optionally one or more additives, including, but not limited to, those additives described further herein, such as, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer of the curable photochromic coating composition can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Examples of polyols that can be present in the curable photochromic coating composition include, but are not limited to glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol. With some further embodiments, the polyols that can be present in the curable photochromic coating composition include, but are not limited to, polyols having number average molecular weights of from 500 to 3500, or from 650 to 2500, or from 650 to 1500, or from 850 to 1200, or from 850 to 1000, such as, but not limited to, polyether polyols and/or polycarbonate polyols. Additional polyols that can be used in the curable photochromic coating composition from which the photochromic coating layer is prepared include, but are not limited to, art-recognized materials, such as polyether polyols and polycarbonate polyols, described in U.S. Pat. No. 7,465,414 at column 15, line 22 through column 16, line 62, which disclosure is incorporated herein by reference.

In accordance with some further embodiments, the polyols that can be present in the curable photochromic coating include, but are not limited to, one or more high molecular weight polycarbonate polyols, that have carbonate groups within the backbone thereof. With some embodiments, such high molecular weight polycarbonate polyols are high molecular weight polycarbonate diols. With some additional embodiments, the high molecular weight polycarbonate polyols further include one or more linkages in the backbone that are selected from ester linkages, ether linkages, amide linkages, and/or urethane linkages. The high molecular weight polycarbonate polyols, with some embodiments, have Mn values of at least 5000 g/mole, or at least 6000 g/mole, or at least 8000 g/mole. The high molecular weight polycarbonate polyols, with some embodiments, have Mn values of less than or equal to 20,000 g/mole, or less than or equal to 15,000 g/mole, or less than or equal to 10,000 g/mole. In accordance with some further embodiments, the high molecular weight polycarbonate polyols have Mn values ranging between any combination of the above recited upper and lower v, such as from 5000 to 20,000 g/mole, or from 6000 to 15,000 g/mole, or from 8000 to 10,000 g/mole. The polycarbonate polyols, with some embodiments, have PDI values of less than or equal to 2.0, or less than or equal to 1.5, or less than or equal to 1.3.

The high molecular weight polycarbonate polyols are, with some embodiments, prepared by art-recognized isolation methods that involve isolating a high molecular weight fraction of polycarbonate polyols from a feed polycarbonate polyol that is composed of a mixture of low and high molecular weight polycarbonate polyols. With some embodiments, the high molecular weight polycarbonate polyols are obtained by successively washing a feed polycarbonate polyol with a suitable solvent, such as methanol, with removal of a low molecular weight fraction between each successive washing, until a product polycarbonate polyol is obtained that has a desirably high (or increased) molecular weight, such as an Mn value of at least 5000 g/mole, and a desirably low (or reduced) PDI value, such as less than or equal to 1.5. With some embodiments, the high molecular weight polycarbonate polyols are isolated from feed aliphatic polycarbonate polyols. Examples of commercially available feed aliphatic polycarbonate polyols, from which the high molecular weight polycarbonate polyols are isolated, with some embodiments, include but are not limited to: PC-1122 polycarbonate polyol, which is commercially available from Stahl USA; ETERACOLL™ PH-200D, PH-200 and UH-200 polycarbonate polyols, which are commercially available from Ube Chemical; DURANOL™ T5652 polycarbonate polyol, which is commercially available from Asahi-KASEI; and/or RAVE-CARB™ 107 polycarbonate polyol, which is commercially available from Enichem.

High molecular weight polycarbonate polyols that can be present in the curable photochromic coating include, but are not limited to, those described in further detail at column 5, line 51 through column 7, line 8 of U.S. Pat. No. 8,608,988 B2, the cited disclosure of which is incorporated herein by reference.

Polyfunctional isocyanates (or polyisocyanates) that can be present in the curable photochromic coating composition from which the photochromic coating layer is prepared include, but are not limited to, aliphatic, aromatic, cycloaliphatic and heterocyclic polyisocyanates, and mixtures of such polyisocyanates. Examples of polyisocyanates that can be present in the photochromic coating composition include, but are not limited to: toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; dimers and trimers of such diisocyanates containing isocyanurate, uretidino, biruet, or allophanate linkages (such as a trimer of isophorone diisocyanate); and mixtures and/or combinations of two or more thereof. Further examples of polyisocyanates that can be present in the photochromic coating composition include, but are not limited to those described in U.S. Pat. No. 7,465,414 at column 16, line 63 through column 17, line 38, which disclosure is incorporated herein by reference.

Catalysts that catalyze the formation of urethane linkages that can be used in the photochromic coating composition from which the photochromic coating layer is prepared include, but are not limited to, art-recognized materials, such as one or more stannous salts of an organic acid, examples of which include, but are not limited to, stannous octoate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Additional classes of catalysts include, but are not limited to, bismuth salts of organic acids, such as bismuth 2-ethylhexanoate, and zinc-based catalysts. The catalyst is present in the photochromic coating composition, with some embodiments, in an amount that is at least sufficient to catalyze the formation of urethane linkages under the particular cure conditions that are employed. With some embodiments, the catalyst is a stannous salt of an organic acid, which is present in an amount of from 0.0005-0.02 parts per 100 parts of the polyurethane-forming components. Further non-limiting examples of components, such as polyols, polyisocyanates, and catalysts, that can, with some embodiments, be used with polyurethane coating compositions from which the photochromic coating compositions of the method of the present invention can be selected, are described in U.S. Pat. Nos. 4,889,413 and 6,187,444 B1.

The photochromic coating composition can further include at least one additive that, with some embodiments, is capable of facilitating one or more of the processing, the properties, or the performance of the photochromic coating composition and resulting photochromic coating layer. Non-limiting examples of such additives include static dyes, photoinitiators, thermal initiators, polymerization inhibitors, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of static dyes (i.e., tints or dyes that are not photochromic) that can be present in the photochromic coating composition and the resulting photochromic coating layer include, but are not limited to, art-recognized static organic dyes that are capable of imparting a desired color or other optical property to the photochromic coating layer. Examples of static dyes that can be present in the photochromic coating composition and photochromic coating layer include, but are not limited to, azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures and/or combinations thereof. Examples of anthraquinone dyes from which the fixed dye can be selected, with some embodiments, include but are not limited to, 1,4-dihydroxy-9,10-antracenedione (CAS registry No. 81-64-1), 1,4-bis(4-methylphenyl)amino-9,10-anthracendione (CAS registry No. 128-80-3), 1,4-bis((2-bromo-4,6-dimethylphenyl)amino)-9,10-anthracenedione (CAS registry No. 18038-98-8), and mixtures thereof.

With some embodiments, the photochromic coating layer is formed from a photochromic coating composition that includes one or more radically polymerizable monomers. Classes and examples of radically polymerizable monomers that can be included in the photochromic coating composition, with some embodiments, include, but are not limited to, those as described previously herein with regard to the lens molding composition. Photochromic coating compositions that include one or more radically polymerizable monomers can further include, with some embodiments, one or more solvents as described previously herein, one or more additives as described herein, and one or more initiators as described previously and further herein.

Non-limiting examples of photoinitiators that can be present in the photochromic coating composition, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in the photochromic coating composition, is a visible light photoinitiator. Examples of suitable visible light photoinitiators include but are not limited to, benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, alpha-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, 2,6-dichlorobenzoyldiphenylphosphine oxide, and 2,6-dimethoxybenzoyldiphenylphosphine oxide, bisacylphosphine oxides, e.g., bis (2,6-dimethyoxybenzoyl)-2,4,4-trimethylepentylphosphine oxide, bis(2,6-dimethylbenzoyl)-2,4,4-trimethylpentylphosphine oxide, bis (2,4,6-trimethylbenzoyl)-2,4,4-trimethylpentylphosphine oxide, and bis(2,6-dichlorobenzoyl)-2,4,4-trimethylpentylphosphine oxide, phenyl-4-octyloxyphenyliodonium hexafluoroantimonate, dodecyldiphenyliodonium hexafluoroantimonate, (4-(2-tetradecanol)oxyphenyl)iodonium hexafluoroantimonate and mixtures thereof. Further examples of photoinitiators are set forth at column 12, line 11 to column 13, line 21 of U.S. Pat. No. 6,602,603, which is specifically incorporated by reference herein.

Examples of thermal initiators include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of polymerization inhibitors include, but are not limited to: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Additional additives that can be present in the photochromic coating composition include hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

Additional additives that can be present in the photochromic coating composition include other adhesion enhancing ingredients. For example, although not limiting herein, the photochromic coating composition can further include an adhesion-enhancing amount of an epoxy-containing material. Adhesion-enhancing amounts of an epoxy-containing materials when included in the photochromic coating composition, can improve the adhesion of a subsequently applied coating or layer thereto. A class of an epoxy (or oxirane) functional adhesion promoters that can be included in photochromic coating composition include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

In accordance with some embodiments, the photochromic coating composition includes an aminoplast crosslinker (such as, but not limited to, a melamine crosslinker) and one or more reactive components having functional groups that are reactive with the aminoplast crosslinker, such as, but not limited to, hydroxyl, carbamate, and/or urea, and is referred to as an aminoplast based photochromic coating composition. Non-limiting examples of aminoplast based coating compositions from which the photochromic coating compositions of the present method can be selected include, but are not limited to, those described in, for example, U.S. Pat. No. 6,432,544 B1 and U.S. Pat. No. 6,506,488.

With some embodiments, the photochromic coating composition is a polysilane (or polysiloxane) photochromic coating composition that includes hydrolysable silane monomers, such as, but not limited to, tetraalkoxy silane (such as tetraethoxy silane and/or tetramethoxy silane), and/or alkyl alkoxy silanes in which the alkyl group optionally includes a functional group, such as oxirane, vinyl, amine, and/or (meth)acryloyl. Non-limiting examples of polysilane based coating compositions from which the photochromic coating compositions of the present method can be selected include, but are not limited to, those described in, for example, U.S. Pat. Nos. 4,556,605, 6,624,237 B2, and 7,157,518 B2.

In accordance with some further embodiments, the photochromic coating composition includes one or more components (such as, but not limited to oligomers and/or polymers) having two or more carboxylic acid anhydride groups and one or more reactive components each independently having two or more groups that are reactive with carboxylic acid anhydride groups, such as hydroxyls, which can be referred to as carboxylic acid anhydride based coating compositions. Non-limiting examples of carboxylic acid anhydride based coating compositions from which the photochromic coating compositions of the present method can be selected include, but are not limited to, those described in, for example, U.S. Pat. Nos. 4,798,745, 4,798,746, and 5,239,012.

With some additional embodiments, the photochromic coating composition includes one or more components (such as, but not limited to oligomers and/or polymers) that include residues of alkoxyacrylamide monomers, such as but not limited to N-alkoxymethyl(meth)acrylamide monomers, which can be referred to as alkoxyacrylamide based coating compositions. Non-limiting examples of alkoxyacrylamide based coating compositions from which the photochromic coating compositions of the present method can be selected include, but are not limited to, those described in, for example, U.S. Pat. Nos. 6,060,001 and 5,618,586.

With some further additional embodiments, the photochromic coating composition includes one or more components (such as, but not limited to oligomers and/or polymers) having two or more oxirane groups, and one or more reactive components each independently having two or more groups that are reactive with oxirane groups, such as hydroxyls, thiols, carboxylic acids, and amines, which can be referred to as oxirane (or epoxy) based coating compositions. Non-limiting examples of oxirane based coating compositions from which the photochromic coating compositions of the present method can be selected include, but are not limited to, those described in, for example, U.S. Pat. Nos. 4,756,973 and 6,268,055 B1.

The method of the present invention further includes, with some embodiments, forming at least one further layer over at least one of: the front surface of the segmented multifocal finished lens; the rear surface of the segmented multifocal finished lens; and the photochromic coating layer. Each further layer is independently selected, with some embodiments, from primer coating layers, protective coating layers, anti-reflective coating layers, polarizing layers, and combinations thereof.

In accordance with some embodiments, at least one of the at least one further layers is interposed between the rear surface of the segmented multifocal finished lens, and the photochromic coating layer. With some further embodiments, at least one primer coating layer and/or at least one protective coating layer is formed and interposed between the rear surface of the segmented multifocal finished lens, and the photochromic coating layer. With some additional embodiments, (i) the organic matrix of the segmented multifocal lens blank (and correspondingly of the finished lens) includes polycarbonate, and (ii) at least one primer coating layer and/or at least one protective coating layer is formed and interposed between the rear surface of the segmented multifocal finished lens, and the photochromic coating layer.

The optional primer coating layer can include a single layer or multiple layers, each having the same or a different composition. The optional primer coating layer typically includes an organic matrix, such as a thermoplastic organic matrix and/or a crosslinked organic matrix. Additionally or alternatively to an organic matrix, the optional primer layer can include an inorganic matrix, including, for example, silane linkages, siloxane linkages and/or titanate linkages. The organic matrix of the optional primer coating layer, with some embodiments, is as described previously herein with regard to the photochromic coating layer. With some embodiments, the organic matrix of the optional primer coating layer includes, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); carbon-carbon linkages; and/or thiourethane linkages (e.g., —N(H)—C(O)—S—).

Typically, the optional primer coating layer is formed from a primer coating composition. The primer coating composition can be a curable primer coating composition, that is curable by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

The optional primer coating layer can have any suitable thickness. With some embodiments, the optional primer coating layer has a thickness of from 0.5 microns to 20 microns, such as from 1 to 10 microns, or from 2 to 8 microns, or from 3 to 5 microns, inclusive of the recited values.

The optional protective coating layer is, with some embodiments, selected from an abrasion-resistant coating, such as a "hard coat." Each protective coating layer can include a single layer or multiple layers, each having the same or a different composition. The optional protective coating layer can be selected from abrasion-resistant coatings including organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the optional protective coating layer is a hard coat layer that includes a first coating of a radiation-cured acrylate-based thin film and a second coating including an organo-silane. Non-limiting examples of commercially available hard coating products include CRYSTALCOAT® abrasion-resistant coatings, commercially available from SDC Coatings, Inc., and HI-GARD® coatings, commercially available from PPG Industries, Inc.

The optional protective coating layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134, 191, 5,231,156 and International Patent Publication WO 94/20581 for disclosures of organo-silane hard coatings, which disclosures are also incorporated herein by reference. The hard coat layer can be applied by those coating methods as described previously herein with regard to the primer layer, such as spin coating.

Other coatings that can be used to form the optional protective coating layer, include, but are not limited to, polyfunctional acrylic hard coatings, melamine-based hard coatings, urethane-based hard coatings, alkyd-based coatings, silica sol-based hard coatings or other organic or inorganic/organic hybrid hard coatings.

The optional protective coating layer, with some embodiments, is selected from art-recognized organo-silane type hard coatings. Organo-silane type hard coatings from which the optional protective coating layer can be selected include, but are not limited to, those disclosed at column 24, line 46 through column 28, line 11 of U.S. Pat. No. 7,465,414 B2, which disclosure is incorporated herein by reference.

Further examples of coating compositions from which the optional protective coating layer can be prepared, with some embodiments, include but are not limited to: (meth)acrylate based protective coating compositions, such as described in U.S. Pat. No. 7,410,691; radiation curable acrylate based protective coating compositions, such as described in U.S. Pat. No. 7,452,611 B2; thermally cured protective coating compositions, such as described in U.S. Pat. No. 7,261,843; maleimide based protective coating compositions, such as described in U.S. Pat. No. 7,811,480; and dendritic polyester (meth)acrylate based protective coating compositions, such as described in U.S. Pat. No. 7,189,456.

The optional anti-reflective coating layer can be selected from art-recognized anti-reflective coating layers, and typically includes at least two layers each having a different refractive index. With some embodiments, the optional anti-reflective coating layer includes a first layer having a refractive index of from 1.6 to 2.5, or from 1.95 to 2.4, and a second layer having a refractive index of from 1.30 to 1.48, or from 1.38 to 1.48. The optional anti-reflective coating layer includes, with some embodiments, a plurality of such alternating first and second layers. With some embodiments, the first layer of the optional anti-reflective coating layer includes at least one of, $TiO_2$, $Ti_2O_3$, $Ti_3O_5$, $Pr_6O_{11}$+$xTiO_2$, $CeO_2$, $HfO_2$, $Ta_2O_5$, $ZrO_2$, and $SnO_2$. With some embodiments, the second layer of the optional anti-reflective coating layer includes at least one of, $SiO_2$, $MgF_2$, $AlF_3$, $BaF_2$, $Na_5Al_3F_{14}$, $Na_3AlF_6$, and $YF_3$. Examples of anti-reflective coating layers from which the optional anti-reflective coating layer can be selected are described in U.S. Pat. No. 6,175,450 B1 at column 1, line 56 through column 2, line 7; column 2, lines 50-65; and column 5, lines 22-58, which disclosure is incorporated herein by reference.

Each optional polarizing layer can, with some embodiments, be selected from art-recognized polarizing layers. With some embodiments, each optional polarizing layer is a conventional linearly polarizing layer formed from one or more layers of unilaterally stretched polymer films, such as unilaterally stretched polyvinyl alcohol films, optionally containing a dichroic material.

The present invention is more particularly described in the following examples, which are intended to be illustrative only, since numerous modifications and variations therein will be apparent to those skilled in the art. Unless otherwise specified, all parts and all percentages are by weight.

EXAMPLES

Parts A through E of the present examples are summarized as follows. In Part A, the preparation of photochromic compounds, which are used in the photochromic coating formulations of Part B, is described. In Part B, the preparation and compositions of photochromic coating formulations C-1 and C-2 are described. In Part C, the preparation of the surfaces of lenses to which the photochromic coating formulations are applied, is described. In Part D, application of the photochromic coating formulations to the lenses and curing thereof is described. In Part E, testing of the coated lenses is described, and the results of such testing tabulated and discussed.

Part A

Photochromic Compounds

The preparation of photochromic compounds PC-1 through PC-8 is provided as follows.

PC-1

3,3-di(4-methoxyphenyl)-13,13-dimethyl-3H-13H-indeno[2',3':3,4]naphtho[1,2-b]pyran was prepared according to the procedure of Example 4 in U.S. Pat. No. 7,527,754, which procedure is incorporated herein by reference, but replacing 1-(4-fluorophenyl)-1-(4-morpholinophenyl)-2-propyn-1-ol with an equimolar amount of 1,1-bis(4-methoxyphenyl)-2-propyn-1-ol (the product of example 1 step 1 in U.S. Pat. No. 5,458,814).

PC-2

3-(4-piperidinophenyl)-3-phenyl-6,11-difluoro-13,13-dimethyl-3H-13H-indeno[2',3':3,4]naphtho[1,2-b]pyran was prepared according to the procedure of Example 4 in U.S. Pat. No. 7,556,751, which procedure is incorporated herein by reference.

PC-3

3-(4-fluorophenyl)-3-(4-morpholinophenyl)-13,13-dimethyl-3H-13H-indeno[2',3':3,4]naphtho[1,2-b]pyran was prepared according to the procedure of Example 4 in U.S. Pat. No. 7,527,754, which procedure is incorporated herein by reference.

PC-4

3-(4-butoxyphenyl)-3-(4-methoxyphenyl)-6,7-dimethoxy-1-trifluoromethyl-13,13-dimethyl-3H-13H-indeno[2',3':3,4]naphtho[1,2-b]pyran was prepared according to the procedure of Example 1 in U.S. Pat. No. 8,748,634, which procedure is incorporated herein by reference, but replacing 1,1-bis(4-methoxyphenyl)-2-propyn-1-ol with an equimolar amount of 1-(4-butoxyphenyl)-1-(4-methoxyphenyl)-2-propyn-1-ol.

PC-5

Step 1.

2,3-dimethoxy-7,7-dimethyl-9-cyano-7H-benzo[C]fluoren-5-ol (3.0 g, the product of Example 1, Step 1 of U.S. Pub. No. 2006/0228557 A1, which example is hereby specifically incorporated by reference herein) and 3,4-dihydro-2H-pyran (1.5 grams) were placed in a reaction flask and 100 mL of dichloromethane was added. The reaction mixture was stirred at room temperatures for 4 hours. The mixture was filtered through a silica gel plug and the organic filtrate was removed by rotary evaporation to give 3.2 grams of grey solid. An NMR spectrum showed the product to have a structure consistent with 2,3-dimethoxy-5-((tetrahydro-2H-pyran-2-yl)oxy)-7,7-dimethyl-7H-9-cyano-benzo[C]-fluorene.

Step 2

The product from Step 1 (3.0 grams), potassium hydroxide (1.18 grams) and iodohexane (4.4 grams) were placed in a reaction flask and 150 mL of t-butyl alcohol was added. The reaction mixture was heated at reflux temperatures for 4 hours and cooled to room temperature. The mixture was poured into 200 mL of water and extracted with ethyl acetate. The organic solvent was removed by rotary evaporation to give 3.4 grams of grey solid. An NMR spectrum showed the product to have a structure consistent with N-hexyl-2,3-dimethoxy-5-((tetrahydro-2H-pyran-2-yl)oxy)-7,7-dimethyl-7H-benzo[C]-fluorene-9-carboxamide.

Step 3.

The product from Step 2 (3.0 grams) was placed in a reaction flask and 100 mL of methanol was added. The reaction mixture was heated at reflux temperature and a few drops of concentrated HCl were added. The mixture was poured into 200 mL of water and extracted with ethyl acetate. The organic solvent was removed by rotary evaporation to give 2.5 grams of white solid. An NMR spectrum showed the product to have a structure consistent with 2,3-dimethoxy-5-hydroxy-7,7-dimethyl-7H-9-cyano-benzo[C]-fluorene.

Step 4.

The product from Step 3 (2 grams), 1,1-bis(4-methoxyphenyl)-2-propyn-1-ol (2.0 grams), dodecylbenzene sulfonic acid (0.5 grams) and chloroform (preserved with pentene, 250 mL) were combined in a reaction flask and stirred at room temperature for 5 hours. The reaction mixture was washed with 50% saturated aqueous sodium bicarbonate (200 mL) and the organic layer was dried over anhydrous sodium sulfate. The solvent was removed by rotary evaporation. Hot methanol was added to the resulting residue and then the mixture cooled to room temperature. The precipitate obtained was collected by vacuum filtration and washed with cold methanol yielding 2.7 grams of N-hexyl-3,3-di(4-methoxyphenyl)-6,7-dimethoxy-13-dimethyl-3H,13H-indeno[2',3':3,4]naphtho[1,2-b]pyran-11-carboxamide.

PC-6

3-(4-methoxyphenyl)-3-(4-morpholinophenyl)-6-methoxy-7-piperidino-11-phenyl-13,13-dimethyl-3H-13H-indeno[2',3':3,4]naphtho[1,2-b]pyran was prepared according to the procedure of Comparative Example CE-6 in U.S. Pat. No. 8,147,725, which procedure is incorporated herein by reference.

PC-7

3,3-di(4-methoxyphenyl)-6-methoxy-7-piperidino-1-phenyl-13,13-dimethyl-3H-13H-indeno[2',3':3,4]naphtho[1,2-b]pyran was prepared according to the procedure of Comparative Example CE-4 in U.S. Pat. No. 8,147,725, which procedure is incorporated herein by reference.

PC-8

3-(4-fluorophenyl)-3-(4-morpholinophenyl)-6,11-dimethoxy-13,13-dimethyl-3H-13H-indeno[2',3':3,4]naphtho[1,2-b]pyran was prepared according to the procedure of Example 4 in U.S. Pat. No. 7,527,754, which procedure is incorporated herein by reference, but replacing 7,7-dimethyl-7H-benzo[C]fluorene-5-ol with an equimolar amount of 3,9-dimethoxy-7,7-dimethyl-7H-benzo[C]fluorene-5-ol (the product of Example 14, step 1 in U.S. Pub. No. 2006/0228557 A1).

Part B

Photochromic Coating Formulations

TABLE 1

Photochromic coating formulations

| Material | Coating C-1 (parts by weight) | Coating C-2 (parts by weight) |
|---|---|---|
| Charge 1 | | |
| N-methyl-2-pyrrolidone | 21.2133 | 26.3260 |
| PC-1 | 0.1590 | — |
| PC-2 | 0.1590 | — |
| PC-3 | 1.2718 | — |
| PC-4 | 0.9539 | — |
| PC-5 | 0.6359 | — |
| PC-6 | — | 1.0978 |
| PC-7 | — | 1.0556 |

TABLE 1-continued

Photochromic coating formulations

| Material | Coating C-1 (parts by weight) | Coating C-2 (parts by weight) |
|---|---|---|
| PC-8 | — | 1.0493 |
| TINUVIN ® 292[(1)] | — | 0.7943 |
| IRGANOX ® 245[(2)] | 1.0599 | — |
| TINUVIN ® 144[(3)] | 1.0599 | — |
| Charge 2 | | |
| SILQUEST ® A-187[(4)] | 2.6505 | 1.8759 |
| K-KAT ® 348[(5)] | 0.5307 | 0.4737 |
| BYK ® 333[(6)] | 0.0400 | 0.0669 |
| Acrylic polyol[(7)] | 16.2913 | — |
| PC1122[(8)] | 15.9859 | 30.3268 |
| TRIXENE ® BI-7960[(9)] | 28.1656 | 18.7336 |
| DESMODUR ® PL340[(10)] | 9.8234 | 6.5490 |
| N-methyl-2-pyrrolidone | — | 11.6512 |

[(1)]A hindered amine light stabilizer, commercially available from BASF.
[(2)]An antioxidant commercially available from BASF.
[(3)]A hindered amine light stabilizer commercially available from BASF.
[(4)]A gamma-glycidoxypropyl trimethoxysilane, available from Osi Specialties of Paris, France
[(5)]A urethane catalyst available from King Industries Inc.
[(6)]A polyether modified dimethylpolysiloxane compolymer, available from BYK-Chemie
[(7)]A poly(meth)acrylic polyol produced by following the procedure of Composition D of Example 1 in U.S. Pat. No. 6,187,444, which procedure is incorporated herein by reference, except that in Charge 2 the styrene was replaced with methyl methacrylate and 0.5% by weight triphenyl phosphite was added, based on the total monomer weight.
[(8)]A polycarbonate diol, available from Stahl.
[(9)]A blocked hexamethylene diisocyanate available from Baxenden Chemical Co.
[(10)]A blocked aliphatic polyisocyanate, available from Bayer Material Science.

The ingredients of Charge 1 were added to a suitable vessel with stirring, and heated to 60° C. for approximately 30 minutes to dissolve the solids. The ingredients of Charge 2 were added to a separate vessel and mixed thoroughly. Charge 2 was added to Charge 1, and the resulting mixture was placed in a container which was then placed on a WHEATON® 348923-A Benchtop Roller, available from Wheaton Industries, Inc., for a minimum of 6 hours prior to use.

Part C
Preparation of Lens Surface

In the following Examples, back side (BS) refers to the concave surface, while front side (FS) refers to the convex surface of a lens substrate.

To demonstrate the attenuating effect of polycarbonate lenses on the activation of photochromic coatings on the back side, 76 mm diameter PDQ® coated polycarbonate piano lenses (available from Gentex Optics, Inc.) with a 6.25 base curve were used as substrates in Examples 1 and 1A, as well as in Comparative Examples CE-1 and CE-1A. The piano lenses were used as supplied without further cleaning. The smooth geometry of piano lenses allowed for facile measurement of performance by the method described below in Part E.

A segmented bifocal polycarbonate lens substrate of 6.75 base curve with +2.00 straight top 28 mm add was used in Example 2. The lens of Example 2 was ground to a prescription power of −4.00. A segmented bifocal polycarbonate substrate of 4.75 base curve with +2.00 straight top 28 mm add was used in Example 3. The lens of Example 3 was ground to a prescription power of +4.00. The ground lenses of Examples 2 and 3 were washed with mild soap and water, rinsed with deionized water, and finally rinsed with isopropyl alcohol prior to plasma treatment described below.

Prior to the application of each coating layer, the substrate lenses were subjected to oxygen plasma at a flow rate of 100 milliliters (mL) per minute of oxygen at 120 watts of power for three minutes. The treatment was applied to the surface which was to be subsequently coated for each Example.

Following oxygen plasma treatment on the back side, the lenses of Examples 2 and 3 were first coated with HI-GARD® 1080 Lens Coating (commercially available from PPG Industries, Inc.) by spin coating. For each of Examples 2 and 3, HI-GARD 1080 was applied to the back side surface and the lens was rotated at 1067 rpm for 8 seconds. The coated lenses were subsequently baked for 1 hour at 120° C. Once cooled, the coated lenses were subject to oxygen plasma under the conditions described above prior to the application of the photochromic coating layer. Examples 1, 1A, CE-1 and CE-1A did not receive this first coating layer.

Part D
Application of Photochromic Coatings

The lenses prepared in Part C were coated with the photochromic coating solutions C-1 or C-2 via a spin coating process. Approximately 1.5 mL of the respective coating solution was dispensed onto the indicated surface of the lens, which was subsequently rotated for 8 seconds at the speeds according to Table 2. The spin speed listed in Table 2 were determined so as to achieve a target coating thickness of approximately 20 microns. The coated lenses were stored in a forced air oven at 40° C. for up to 30 minutes, followed by a 1 hour cure cycle in a forced air oven at 120° C. After removal from the oven and cooling for a minimum of 15 minutes, the lenses were again treated with oxygen plasma as above. Each of the lenses were then spin coated with HI-GARD 1080 at a spin speed of 1067 rpm for 8 seconds. The lenses were then cured for 3 hours at 120° C. Attempts to apply photochromic coatings to the front surface of the bifocal lens substrates resulted in visually unacceptable, uneven coating thicknesses in the area of the bifocal edge, and thus were not pursued further.

TABLE 2

Photochromic coating parameters

| Example | Photochromic Coating | Lens surface coated | Spin speed (rpm) |
|---|---|---|---|
| CE-1 | C-1 | BS | 644 |
| CE-1A | C-1 | FS | 765 |
| 1 | C-2 | BS | 644 |
| 1A | C-2 | FS | 644 |
| 2 | C-2 | BS | 916 |
| 3 | C-2 | BS | 916 |

Part E
Performance Testing

Lens Examples with coatings on the back side (BS) were tested for photochromic response (e.g., the change in optical density) under conditions simulating outdoor exposure with activation Through the Lens (TL). Lens Examples with coatings on the front side (FS) were tested for photochromic response under conditions simulating outdoor exposure in the Outdoor Simulation Test (OS).

The photochromic samples prepared as described in Part D were tested for photochromic response in the Outdoor Simulation (OS) Test and the Through the Lens (TL) Test as described herein on an Advance Bench for Measuring Photochromics (A-BMP) optical bench custom made by PPG Industries, Inc. The TL Test was used to activate a photochromic lens with the activating solar light passing through the lens to reach the backside coating. The irradiance intensity at the front side of all coated lenses for both the OS test and the TL test was 6.7 Watts/m$^2$ (UVA)

integrated between 315 and 380 nm and 50 Klux. The TL was tested with the photochromic coated side (back side) facing away from the activation source. The OS was tested with the photochromic coated side (front side) facing toward the activation source.

Prior to testing on the optical bench, the photochromic lenses were conditioned by activating and fading as described hereinafter. The lenses were first exposed to 365 nanometer ultraviolet light for about 10 minutes at a distance of about 14 centimeters to activate the photochromic compounds. The UVA (315 to 380 nm) irradiance at the sample was measured with a Licor Model Li-1800 spectroradiometer and found to be 22.2 watts per square meter. The activated samples were then placed under a 500 watt, high intensity halogen lamp for about 10 minutes at a distance of about 36 centimeters to bleach or inactivate the photochromic compounds. The illuminance at the sample was measured with the Licor spectroradiometer and found to be 21.4 Klux. The lenses were then kept covered for at least 1 hour prior to testing on an optical bench.

The A-BMP optical bench was fitted with two 150 watt Xenon arc lamps positioned 90° apart (one lamp to provide the amount of UV/VIS light and one to provide the additional contribution of visible light). The collimated output beams from the xenon arc lamps were combined and directed toward the sample cell through a 50/50 beam splitter. Each lamp was filtered and shuttered individually and also shuttered after blending, prior to entering the sample cell. The light path from Lamp 1 was directed through a 3 mm Schott KG-2 band-pass filter and appropriate neutral density filters that contributed to the required UV and partial VIS light irradiance level. The light path from the Lamp 2 was directed through a 3 mm Schott KG-2 band-pass filter, a 400 nm cutoff filter and neutral density filters in order to provide supplemental VIS light illuminance. The samples were controlled at a temperature of 23° C. using an FTS™ Systems AirJet™ XE maintained at 3.5 cfm pressure flow through sample chamber. Proprietary software was used on the A-BMP to control timing, irradiance, air cell and sample temperature, shuttering, filter selection and response measurement. A Zeiss spectrophotometer, Model MCS 601, with fiber optic cables for light delivery through the sample was used for response and color measurement.

Response measurements, in terms of change in optical density (ΔOD) from the unactivated state to the activated or darkened state were determined by establishing the initial unactivated transmittance, opening the shutter from the Xenon lamp(s) and measuring the transmittance during activation of the sample at selected intervals of time. The term "ΔOD" and equivalent recitations, such as "delta OD," means change in optical density (OD) and is determined according to the formula:

$$\Delta OD = \log(\% \ Tb / \% \ Ta)$$

In the above formula, % Tb is the percent photopic transmittance in the bleached state (or non-colored state), % Ta is the percent photopic transmittance in the activated state (or colored state) and the logarithm is to the base 10.

Related Examples were compared to one another to obtain retained optical density, calculated by using the following formula:

$$\% \ \Delta OD \ \text{Retained} = 100 \times (\Delta OD_{TL}/\Delta OD_{OS})$$

TABLE 3

Photochromic performance

| Example | Coating Example | Lens surface coated | OS or TL Tested | Activated OD@23° C. | % ΔOD Retained |
|---|---|---|---|---|---|
| CE-1 | C-1 | BS | TL | 0.61 | 70 |
| CE-1A | C-1 | FS | OS | 0.87 | — |
| 1 | C-2 | BS | TL | 1.23 | 96 |
| 1A | C-2 | FS | OS | 1.28 | — |
| 2 | C-2 | BS | TL | *Photochromic with no visible irregularities | |
| 3 | C-2 | BS | TL | *Photochromic with no visible irregularities | |

*Due to the irregular geometry of the surface of the bifocal lens, accurate measurements could not be made.

Comparison of OS and TL results in Table 3 demonstrates the attenuation of incident light when a coating is irradiated through the lens. Examples 1 and 1A demonstrate the improved performance of a dye package that comprises dyes with pi-conjugation extending groups as compared with the absence of such dyes in Comparative Examples CE-1 and CE-1A.

The present invention has been described with reference to specific details of particular embodiments thereof. It is not intended that such details be regarded as limitations upon the scope of the invention except insofar as and to the extent that they are included in the accompanying claims.

What is claimed is:

1. A method of forming a photochromic segmented multifocal lens comprising:
    (a) forming a segmented multifocal lens blank by molding, wherein said segmented multifocal lens blank has a front surface and a rear surface, said front surface of said segmented multifocal lens blank comprising a segmented optical power addition portion;
    (b) grinding said rear surface of said segmented multifocal lens blank, thereby forming a segmented multifocal finished lens having a front surface and a rear surface, said front surface of said segmented multifocal finished lens comprising said segmented optical power addition portion;
    (c) forming a photochromic coating layer over at least a portion of said rear surface of said segmented multifocal finished lens, said photochromic coating layer comprising at least one photochromic compound,
    wherein said segmented multifocal lens blank is a substantially unitary segmented multifocal lens blank,
    wherein said photochromic compound, of said photochromic coating layer, comprises at least one of indeno-fused naphthopyrans, naphtho[1,2-b]pyrans, naphtho[2,1-b]pyrans, spirofluoreno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, and diarylalkenylethenes, and
    wherein said photochromic compound, of said photochromic coating layer, is converted from a closed-form to an open-form by electromagnetic radiation having a wavelength of greater than 390 nm.

2. The method of claim 1 wherein forming said segmented multifocal lens blank by molding comprises, providing a mold having an interior space,
introducing a lens molding composition into said interior space of said mold, and
removing said segmented multifocal lens blank from said mold.

3. The method of claim 2 wherein said segmented multifocal lens blank comprises an organic matrix comprising, polycarbonate, poly(allyl-carbonate), polyurethane, polythiourethane, poly(urea-urethane), poly(meth)acrylate, polyolefin, polyvinyl, polyester, polyether, and combinations thereof.

4. The method of claim 1 wherein grinding said rear surface of said segmented multifocal lens blank provides said segmented multifocal finished lens with an ophthalmic correction.

5. The method of claim 1 wherein said photochromic compound, of said photochromic coating layer, is converted from a closed-form to an open-form by electromagnetic radiation having a wavelength of greater than 390 nm to 450 nm.

6. The method of claim 1 wherein said photochromic compound, of said photochromic coating layer, comprises at least one of indeno-fused naphthopyran.

7. The method of claim 6 wherein said indeno-fused naphthopyran is represented by the following Formula (I),

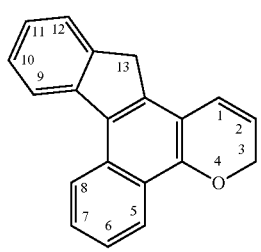

(I)

wherein a pi-conjugation extending group is bonded to at least one of, the 6-position, the 7-position, and the 11-position of said indeno-fused naphthopyran, each pi-conjugation extending group independently extending the pi-conjugation system of said indeno-fused naphthopyran.

8. The method of claim 7 wherein each pi-conjugation extending group independently has at least one pendent halo-substituted group bonded thereto.

9. The method of claim 8 wherein each pi-conjugation extending group independently is:

a group represented by

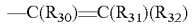

—C($R_{30}$)=C($R_{31}$)($R_{32}$)

or

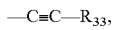

—C≡C—$R_{33}$, wherein $R_{30}$, $R_{31}$ and $R_{32}$ are each independently, amino, dialkyl amino, diaryl amino, acyloxy, acylamino, a substituted or unsubstituted $C_1$-$C_{20}$ alkyl, a substituted or unsubstituted $C_2$-$C_{20}$ alkenyl, a substituted or unsubstituted $C_2$-$C_{20}$ alkynyl, halogen, hydrogen, hydroxy, oxygen, a polyol residue, a substituted or unsubstituted phenoxy, a substituted or unsubstituted benzyloxy, a substituted or unsubstituted alkoxy, a substituted or unsubstituted oxyalkoxy, alkylamino, mercapto, alkylthio, a substituted or unsubstituted aryl, a substituted or unsubstituted heteroaryl, a substituted or unsubstituted heterocyclic group, provided that at least one of $R_{30}$, $R_{31}$ and $R_{32}$ is said pendent halo-substituted group, and $R_{33}$ is said pendent halo-substituted group.

10. The method of claim 9 wherein said pendent halo-substituted group, of each pi-conjugation extending group, is independently selected from the group consisting of halo-substituted($C_1$-$C_{10}$)alkyl, halo-substituted($C_2$-$C_{10}$)alkenyl, halo-substituted($C_2$-$C_{10}$)alkynyl, halo-substituted($C_1$-$C_{10}$)alkoxy and halo-substituted($C_3$-$C_{10}$)cycloalkyl, and
wherein each halo group of each pendent halo-substituted group being independently selected from the group consisting of fluorine, chlorine, bromine and iodine.

11. The method of claim 7 wherein each pi-conjugation extending group independently is:
substituted or unsubstituted aryl; or
substituted or unsubstituted heteroaryl.

12. The method of claim 11 wherein said substituted aryl and said substituted heteroaryl are in each case independently substituted with at least one member selected from the group consisting of substituted or unsubstituted alkyl, substituted or unsubstituted alkoxy, substituted or unsubstituted oxyalkoxy, amide, substituted or unsubstituted amino, substituted or unsubstituted aryl, substituted or unsubstituted heteroaryl, azide, carbonyl, carboxy, ester, ether, halogen, hydroxy, polyol residue, substituted or unsubstituted phenoxy, substituted or unsubstituted benzyloxy, cyano, nitro, sulfonyl, thiol, substituted or unsubstituted heterocyclic group, provided that if the aryl group or the heteroaryl group comprises more than one substituent, each substituent may be independently chosen.

13. The method of claim 7 wherein said indeno-fused naphthopyran is free of said pi-conjugation extending group bonded to the 6-position and the 7-position of said indeno-fused naphthopyran, and said indeno-fused naphthopyran further comprises an ether group bonded to at least one of, the 6-position and the 7-position of said indeno-fused naphthopyran,
wherein each ether group bonded to the 6-position and/or the 7-position of said indeno-fused naphthopyran is independently represented by the following formula, —O$R_8$',
wherein $R_8$' is phenyl($C_1$-$C_3$)alkyl, $C_1$-$C_6$ alkyl, mono ($C_1$-$C_6$)alkyl substituted phenyl($C_1$-$C_3$)alkyl, mono ($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$) alkyl substituted $C_3$-$C_7$ cycloalkyl, $C_1$-$C_6$ chloroalkyl, $C_1$-$C_6$ fluoroalkyl, allyl, or
$R_8$' is the group, —CH($R_9$')Q, wherein $R_9$' is hydrogen or $C_1$-$C_3$ alkyl, and Q is —CN, —$CF_3$ or —COO$R_{10}$', wherein $R_{10}$' is hydrogen or $C_1$-$C_3$ alkyl.

14. The method of claim 13 wherein $R_8$', of each ether group bonded to the 6-position and/or the 7-position of said indeno-fused naphthopyran, is independently selected from linear or branched $C_1$-$C_6$ alkyl.

15. The method of claim 7 wherein said indeno-fused naphthopyran is free of said pi-conjugation extending group bonded to the 6-position and the 7-position of said indeno-fused naphthopyran, and said indeno-fused naphthopyran further comprises an amino group bonded to at least one of, the 6-position and the 7-position of said indeno-fused naphthopyran,
wherein each amino group bonded to the 6-position and/or the 7-position of said indeno-fused naphthopyran is independently selected from the group consisting of:
(1) —N($R_{15}$)$R_{16}$  wherein $R_{15}$ and $R_{16}$ are each selected from the group consisting of hydrogen provided that only one of $R_{15}$ and $R_{16}$ is hydrogen, $C_1$-$C_8$ alkyl, phenyl, naphthyl, heteroaromatic groups, furanyl, benzofuran-2-yl, benzofuran-3-yl, thienyl, benzothien-2-yl, benzothien-3-yl, dibenzofuranyl, dibenzothienyl, benzopyridyl and fluorenyl, $C_1$-$C_8$ alkylaryl, $C_3$-$C_{20}$ cycloalkyl, $C_4$-$C_{20}$ bicycloalkyl, $C_5$-$C_{20}$ tricycloalkyl and $C_1$-$C_{20}$ alkoxyalkyl, wherein said aryl group is phenyl or naphthyl;

(2) a nitrogen containing ring represented by the following formula,

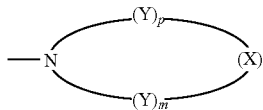

wherein Y is independently selected for each p and each m from the group consisting of —$CH_2$—, —$CH(R_{17})$—, —$C(R_{17})(R_{17})$—, —CH(aryl)-, —$C(aryl)_2$-, and —$C(R_{17})$(aryl)-, and X is selected from the group consisting of —Y—, —O—, —S—, —S(O)—, —$S(O_2)$—, —NH—, —$NR_{17}$— and —N-aryl, wherein $R_{17}$ is in each instance independently selected from $C_1$-$C_6$ alkyl, said aryl substituent is phenyl or naphthyl, m is the integer 1, 2 or 3, and p is the integer 0, 1, 2, or 3, provided that when p is 0, X is Y; and (3) a group represented by the following formulas:

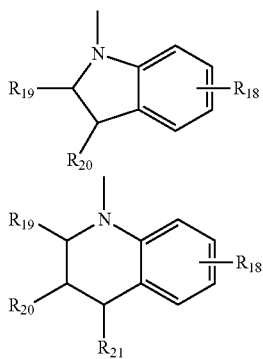

wherein $R_{19}$, $R_{20}$ and $R_{21}$ are each hydrogen, $C_1$-$C_5$ alkyl, phenyl or naphthyl, or the groups $R_{19}$ and $R_{20}$ together form a ring of 5 to 8 carbon atoms, and $R_{18}$ is $C_1$-$C_6$ alkyl, $C_{1-6}$ alkoxy, fluoro or chloro.

16. The method of claim 15 wherein each amino group bonded to the 6-position and/or the 7-position of said indeno-fused naphthopyran is independently selected from substituted or unsubstituted piperidenyl and substituted or unsubstituted morpholino.

17. The method of claim 7, wherein said indeno-fused naphthopyran further comprises at least one ring-opened group represented by the following Formula (II),

wherein independently for each ring-opened group represented by Formula (II),
$L^1$ is a bond or a multivalent hydrocarbyl group or a multivalent substituted hydrocarbyl group, each optionally interrupted with at least one of —O—, —S—, —C(O)—, —C(O)O—, —OC(O)O—, —S(O)—, —$SO_2$—, —$N(R^9)$— and —$Si(R^9)$($R^{10}$)— wherein $R^9$ and $R^{10}$ are each independently selected from hydrocarbyl and substituted hydrocarbyl, and combinations of two or more thereof, $L^2$, independently for each t, is chosen from —O—, —$N(R^b)$—, and —S—, wherein $R^b$, independently for each t, is chosen from hydrogen, hydrocarbyl, and substituted hydrocarbyl, $R^a$, independently for each s, is chosen from a ring-opened cyclic ester monomer and a ring-opened cyclic carbonate monomer, E, independently for each t, is chosen from hydrogen, hydrocarbyl and substituted hydrocarbyl each optionally interrupted with at least one of —O—, —S—, —C(O)—, —C(O)O—, —OC(O)O—, —S(O)—, —$SO_2$—, —$N(R^9)$— and —$Si(R^9)$($R^{10}$)— wherein $R^9$ and $R^{10}$ are each independently selected from hydrocarbyl and substituted hydrocarbyl, and combinations of two or more thereof, s, independently for each t, is from 1 to 500, and t is from 1 to 20, wherein said ring-opened group is bonded to at least one of the 3-position, the 5-position, the 6-position, the 7-position, the 8-position, the 9-position, the 10-position, the 11-position, the 12-position, and the 13-position of said indeno-fused naphthopyran, provided that said pi-extending group is bonded to at least one of, the 6-position, the 7-position, and the 11-position of said indeno-fused naphthopyran.

18. The method of claim 1 wherein said photochromic compound, of said photochromic coating layer, comprises a reaction product of:
(a) at least one ring-opening cyclic monomer chosen from a cyclic ester, a cyclic carbonate, and combinations thereof; and
(b) a photochromic initiator.

19. The method of claim 18 wherein the photochromic initiator comprises at least one functional group adapted to initiate ring-opening of the at least one ring-opening cyclic monomer, further wherein each functional group is chosen from an alcohol, an amine, a carboxylic acid, a silanol, a thiol, salts thereof, and combinations thereof.

20. The method of claim 19 wherein each functional group is chosen from a primary alcohol group, a secondary alcohol group, salts thereof, and combinations thereof.

21. The method of claim 1 wherein forming said photochromic coating layer over at least a portion of said rear surface of said segmented multifocal finished lens comprises,
applying a photochromic coating composition over at least a portion of said rear surface of said segmented multifocal finished lens, thereby forming an applied photochromic coating composition over at least said portion of said rear surface of said segmented multifocal finished lens, and
converting said applied photochromic coating composition to said photochromic coating layer residing over at least said portion of said rear surface of said segmented multifocal finished lens.

22. The method of claim 21 wherein said photochromic coating composition is a curable photochromic coating composition, and converting said applied photochromic coating composition to said photochromic coating layer comprises curing said applied photochromic coating composition.

23. The method of claim 22 wherein said photochromic coating layer comprises an organic matrix, and said organic matrix comprises,
(i) a polymer chosen from poly(meth)acrylates, polyethers, polythioethers, polyesters, polyamides, polyurethanes, polythiourethanes, polyvinyls, polyolefins, and combinations thereof, and
(ii) a plurality of crosslink linkages chosen from ether linkages, sulfide linkages, carboxylic acid ester linkages, carbonate linkages, urethane linkages, thiourethane linkages, siloxane linkages, carbon-carbon linkages, and combinations thereof.

24. The method of claim 1 wherein forming said photochromic coating layer over at least a portion of said rear surface of said segmented multifocal finished lens results in formation of a photochromic segmented multifocal finished lens,
wherein said method further comprises edging said photochromic segmented multifocal finished lens, thereby forming a photochromic segmented multifocal edged lens that is dimensioned to be received and retained within an optical frame.

25. The method of claim 1 further comprising forming at least one further layer over at least one of,
said front surface of said segmented multifocal finished lens,
said rear surface of said segmented multifocal finished lens, and
said photochromic coating layer,
wherein each further layer is selected from primer coating layers, protective coating layers, anti-reflective coating layers, polarizing layers, and combinations thereof.

26. The method of claim 25 wherein at least one further layer is interposed between said rear surface of said segmented multifocal finished lens, and said photochromic coating layer.

* * * * *

UNITED STATES PATENT AND TRADEMARK OFFICE
CERTIFICATE OF CORRECTION

PATENT NO.         : 10,493,486 B2                                Page 1 of 1
APPLICATION NO.    : 15/037110
DATED              : December 3, 2019
INVENTOR(S)        : Paul J. Lynch et al.

It is certified that error appears in the above-identified patent and that said Letters Patent is hereby corrected as shown below:

In the Claims

Column 53, Line 56, Claim 17, delete "claim 7," and insert -- claim 7 --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*